US012448505B2

(12) United States Patent
Bai et al.

(10) Patent No.: US 12,448,505 B2
(45) Date of Patent: Oct. 21, 2025

(54) ETHYLENE-BASED COPOLYMER AND PROPYLENE-ALPHA-OLEFIN-DIENE COMPOSITIONS FOR USE IN LAYERED ARTICLES

(71) Applicant: ExxonMobil Chemical Patents Inc., Baytown, TX (US)

(72) Inventors: Zhifeng Bai, Houston, TX (US); Scott H. Loyd, League City, TX (US); Milind B. Joshi, Bengaluru (IN); Felix M. Zacarias, Houston, TX (US); Xiao Bo Peng, Shanghai (CN); Yuya Iwashita, Yokohoma (JP)

(73) Assignee: ExxonMobil Chemical Patents Inc., Baytown, TX (US)

( * ) Notice: Subject to any disclaimer, the term of this patent is extended or adjusted under 35 U.S.C. 154(b) by 819 days.

(21) Appl. No.: 17/624,884

(22) PCT Filed: Jul. 17, 2020

(86) PCT No.: PCT/US2020/042642
§ 371 (c)(1),
(2) Date: Jan. 5, 2022

(87) PCT Pub. No.: WO2021/011911
PCT Pub. Date: Jan. 21, 2021

(65) Prior Publication Data
US 2022/0290013 A1    Sep. 15, 2022

Related U.S. Application Data

(60) Provisional application No. 62/875,196, filed on Jul. 17, 2019.

(51) Int. Cl.
*C08L 23/16*    (2006.01)
*B60C 1/00*    (2006.01)
(Continued)

(52) U.S. Cl.
CPC ............ *C08L 23/16* (2013.01); *B60C 1/0008* (2013.01); *B60C 1/0025* (2013.01);
(Continued)

(58) Field of Classification Search
CPC ...................................................... C08L 23/16
See application file for complete search history.

(56) References Cited

U.S. PATENT DOCUMENTS 5,571,868 A    11/1996    Datta et al.
5,654,370 A    8/1997    Datta et al.
(Continued)

FOREIGN PATENT DOCUMENTS

EP    3201009    8/2017
JP    2009532518 A  *  9/2009    ............ C08F 255/06
(Continued)

OTHER PUBLICATIONS

Beatty, J.R., (1969) "A Mechanical Method for Estimating Both Tackiness and Stickiness of Rubber Compounds", Rubber Chemistry and Technology, vol. 42, No. 4, pp. 1041-1053.
(Continued)

*Primary Examiner* — Robert S Jones, Jr.
*Assistant Examiner* — Lily K Sloan
(74) *Attorney, Agent, or Firm* — ExxonMobil Technology and Engineering Company

(57) ABSTRACT

An elastomeric composition is provided that includes from 1 to 100 parts by weight per hundred parts by weight rubber (phr) of a first propylene-α-olefin-diene (PEDM) terpolymer comprising 70 wt % to 92.5 wt % propylene, 7.5 wt % to 30 wt % a C2 or C4-C12 α-olefin, and 3.5 wt % to 20 wt % diene, said wt % based on the weight of the PEDM terpolymer. The PEDM terpolymer V may have a Mooney viscosity (ML(1+4)) of 25 MU to 100 MU. The composition may
(Continued)

further include from 0 to 99 phr of an ethylene-based copolymer comprising 40 wt % to 95 wt % ethylene.

26 Claims, 4 Drawing Sheets

(51) Int. Cl.
| | |
|---|---|
| *C08F 4/602* | (2006.01) |
| *C08F 4/6592* | (2006.01) |
| *C08F 210/02* | (2006.01) |
| *C08F 210/06* | (2006.01) |
| *C08J 3/22* | (2006.01) |
| *C08J 3/24* | (2006.01) |
| *C08K 5/01* | (2006.01) |
| *C08L 7/00* | (2006.01) |
| *C08L 9/00* | (2006.01) |
| *C08L 23/22* | (2006.01) |
| *C08L 23/283* | (2025.01) |
| *C09J 123/16* | (2006.01) |
| *C08F 210/16* | (2006.01) |

(52) U.S. Cl.
CPC ......... *C08F 4/6028* (2013.01); *C08F 4/6592* (2013.01); *C08F 210/02* (2013.01); *C08F 210/06* (2013.01); *C08J 3/22* (2013.01); *C08J 3/24* (2013.01); *C08K 5/01* (2013.01); *C08L 7/00* (2013.01); *C08L 9/00* (2013.01); *C08L 23/22* (2013.01); *C08L 23/283* (2013.01); *C09J 123/16* (2013.01); *C08F 210/16* (2013.01); *C08L 2205/02* (2013.01); *C08L 2205/025* (2013.01); *C08L 2205/03* (2013.01); *C08L 2312/00* (2013.01); *C08L 2314/06* (2013.01); *C09J 2423/16* (2013.01); *C09J 2467/006* (2013.01)

(56) References Cited

U.S. PATENT DOCUMENTS

| | | | |
|---|---|---|---|
| 5,710,218 | A | 1/1998 | Nakahama et al. |
| 6,410,651 | B1 * | 6/2002 | Castellani .............. H01B 7/295 |
| | | | 525/232 |
| 7,199,189 | B2 | 4/2007 | Ravishankar et al. |
| 7,390,866 | B2 | 6/2008 | Datta et al. |
| 7,605,217 | B2 | 10/2009 | Datta et al. |
| 7,867,433 | B2 | 1/2011 | Jacob et al. |
| 7,928,165 | B2 | 4/2011 | Datta et al. |
| 8,013,093 | B2 | 9/2011 | Datta et al. |
| 8,765,832 | B2 | 7/2014 | Jacob |
| 8,841,383 | B2 | 9/2014 | Rodgers et al. |
| 10,899,853 | B2 | 1/2021 | Canich et al. |
| 11,053,381 | B2 | 7/2021 | Dharmarajan et al. |
| 11,390,734 | B2 | 7/2022 | Dharmarajan et al. |
| 2005/0008807 | A1 * | 1/2005 | Wilson .................... C08L 23/16 |
| | | | 428/36.91 |
| 2011/0015354 | A1 * | 1/2011 | Marchand ............. C08F 297/08 |
| | | | 526/348.3 |
| 2013/0050488 | A1 | 2/2013 | Brouard et al. |
| 2015/0056392 | A1 * | 2/2015 | Li ........................... C08L 23/16 |
| | | | 428/36.9 |
| 2021/0047505 | A1 | 2/2021 | Loyd et al. |
| 2022/0119633 | A1 | 4/2022 | Bai et al. |
| 2022/0290014 | A1 | 9/2022 | Bai et al. |

FOREIGN PATENT DOCUMENTS

| | | |
|---|---|---|
| WO | 2016/053541 | 4/2016 |
| WO | 2016/053542 | 4/2016 |
| WO | 2016/114914 | 7/2016 |
| WO | 2018/005852 | 1/2018 |
| WO | 2018/190940 | 10/2018 |

OTHER PUBLICATIONS

Hamed, G.R., (1981) "Tack and green strength of elastomeric materials", Rubber Chemistry and Technology, vol. 54, No. 3, pp. 576-595.

* cited by examiner

ETHYLENE-BASED COPOLYMER AND PROPYLENE-ALPHA-OLEFIN-DIENE COMPOSITIONS FOR USE IN LAYERED ARTICLES

CROSS REFERENCE TO RELATED APPLICATION

This application is a U.S. national phase application of PCT Application No. PCT/US2020/042642 having a filing date of Jul. 17, 2020, which claims priority to and the benefit of U.S. Provisional Application Ser. No. 62/875,196 having a filing date of Jul. 17, 2019, the contents of both of which are incorporated by reference in their entirety.

FIELD

The present disclosure relates to polymer compositions comprising ethylene-based copolymers and propylene-α-olefin-diene (PEDM) terpolymers and belts, hoses, and roofing and other articles comprising such blends of copolymers and terpolymers.

BACKGROUND

Elastomeric polymer compounds, such as EP(D)M rubbers, are widely used in the automotive and industrial applications (e.g., brake components, under-the-hood hoses, automotive radiator coolant hoses, air conditioning hoses, steam hoses, power transmission belts, such as V-belts, flat belts, toothed or synchronous belts, multi-ribbed belts, and conveyor belts), taking advantage of their outstanding thermal and oxidative stability, and their excellent chemical resistance to polar organic and aqueous inorganic fluids.

The required performance for automotive coolant, air and heater hoses, air conditioning (A/C), and brake hose formulations include high green and tear strength, good retention of properties after aging with a balance of low temperature flexibility and compression set, and easy mixing and processing properties. Belts, like power transmission belts and conveyor belts, have similar requirements. EP(D)M elastomers offer these properties and has been widely accepted as a reliable material of choice for a broad range of applications, such as general purpose hose, heat resistant hose, high-heat resistant hose, transmission belts, conveyor belts, and the like.

Power transmission belts include V-belts, flat belts, toothed or synchronous belts and multi-ribbed belts. Belt construction typically includes an elastomeric belt body, spiraled or helically wound tension cord or other textile tensile member embedded in the belt body, and often other textile reinforcements embedded in the belt body or covering one or more of the belt surfaces.

The elastomeric belt body may include one or more vulcanized rubber compositions, or an elastomeric composition, such as a thermoplastic elastomer composition. Elastomer compositions have traditionally included ethylene-propylene-(optional diene) polymers, known as EP(D)M polymers or EP(D)M rubbers. Elastomeric compositions based on EP(D)M polymers need to possess the right combination of processability and physical properties both in the vulcanized and unvulcanized state to satisfy manufacturing and end use application requirements.

Two noteworthy properties currently lacking in vulcanized EP(D)M compositions for use of the compositions for transmission belt applications are tack and green strength, especially the balance between the two. Tack (aka., rubber-to-rubber tack, build tack, or green tack) is the force required to separate two identical composition samples (e.g., rubber specimens) or a rubber specimen with another substrate such as textile, while green strength is the tensile modulus measured at 25% or other extension of a composition sample (e.g., a rubber specimen). As used herein, "green" modifies a term and means uncured.

From a manufacturing standpoint, for unvulcanized EP(D)M compositions, the uncured elastomeric sheets coming off the calendar roll should possess adequate tack to retain intimate contact and bonding of rubber to rubber and other reinforcement element such as textile during processing before curing and permit splicing of individual sheets to form a sheet that is several times larger than the width of the calendared sheet when it exits the roll. The unvulcanized elastomer should also have adequate green strength to be rolled onto a mandrel without sagging. However, it has been found that EP(D)M polymers have insufficient tack and perhaps green strength that limit their use as (and manufacture of) transmission belts.

Tack and green strength are influenced by polymer crystallinity. Lower crystallinity leads to greater tack. For example, tack of an EP(D)M composition can be modified by lowering the ethylene content of the EP(D)M polymer and thereby reducing crystallinity.

However, lower crystallinity reduces green strength. Furthermore, lower crystallinity is typically detrimental to properties such as tensile strength, tear resistance, and abrasion resistance, which are also important properties for transmission belts. Similar need in better tack or a better balance of tack and green strength also exists for conveyer belts, hose, roofing and other EP(D)M applications. Indeed, design of a single polymer (or polymer composition) that has these contrasting polymer features to meet the tack and green strength requirements presents a challenge in creating an acceptable polymer synthesis process.

Hydrocarbon tackifiers have been used as additives in EP(D)M compositions to enhance tack. However, non-hydrogenated tackifiers co-vulcanize with the EP(D)M, but do not display long-term heat resistance due, at least in part, to their unsaturation. Hydrogenated tackifiers show better thermal stability; however, they are more expensive and potentially detrimental to curing and mechanical properties due to uncrosslinking with EP(D)M. Moreover, tackifying resins directionally increase EP(D)M compound costs, when incorporated as an additive without replacing the EP(D)M polymer component.

Some potentially relevant background references include: WIPO Publication Nos. WO 2016/053541, WO 2016/053542, WO 2016/114914; U.S. Pat. Nos. 5,654,370; 5,571,868; 7,199,189; 7,390,866; 7,605,217; 7,867,433; 7,928,165; 8,013,093; 8,765,832; and 8,841,383; U.S. Patent Publication No. 2013/050488; as well as J. R. Beatty, *Rubber Chem. & Tech.*, 42, 1041 (1969) and G. R. Hamed, *Rubber Chem. & Tech.*, 54, 578 (1981).

There is a need for polymers and polymer compositions having adequate tack and green strength for use in belts, hoses, and roofing.

SUMMARY

Embodiments of the present disclosure include elastomeric compositions comprising a propylene-α-olefin-diene (PEDM) terpolymer and, optionally, an ethylene-based copolymer (e.g., an EP(D)M). The PEDM terpolymers described herein may comprise 70 wt % to 92.5 wt % propylene, 7.5 wt % to 30 wt % a C2 or C4-C12 α-olefin, and 3.5 wt % to 20 wt % diene, said wt % based on the weight of the PEDM terpolymer, and the PEDM terpolymer may have a Mooney viscosity (ML(1+4)) of 25 MU to 100 MU.

In one aspect, an elastomeric composition is provided that includes from 1 to 100 parts by weight per hundred parts by weight rubber (phr) of a first propylene-α-olefin-diene (PEDM) terpolymer comprising 70 wt % to 92.5 wt % propylene, 7.5 wt % to 30 wt % a C2 or C4-C12 α-olefin, and 3.5 wt % to 20 wt % diene, said wt % based on the weight of the PEDM terpolymer, wherein the PEDM terpolymer has a Mooney viscosity (ML(1+4)) of 25 MU to 100 MU; and optionally, from 0 to 99 phr of an ethylene-based copolymer comprising 40 wt % to 95 wt % ethylene, 0 wt % to 10 wt % of one or more dienes, and 5 wt % to 60 wt % C3 to C12 α-olefin, said wt % based on the total weight of the ethylene-based copolymer.

In another aspect, an elastomeric composition is provided that includes from 1 to 30 parts by weight per hundred parts by weight rubber (phr) of a propylene-α-olefin-diene (PEDM) terpolymer comprising 70 wt % to 92.5 wt % propylene, 7.5 wt % to 30 wt % a C2 or C4-C12 α-olefin, and 0.5 wt % to 3.4 wt % diene, said wt % based on the weight of the PEDM terpolymer, wherein the PEDM terpolymer has a Mooney viscosity (ML(1+4)) of 10 MU to 100 MU; and from 70 to 99 phr of an ethylene-based copolymer comprising 40 wt % to 95 wt % ethylene, 0 wt % to 10 wt % of one or more dienes, and 5 wt % to 60 wt % C3 to C12 α-olefin, said wt % based on the total weight of the ethylene-based copolymer.

DETAILED DESCRIPTION

Figure 1:
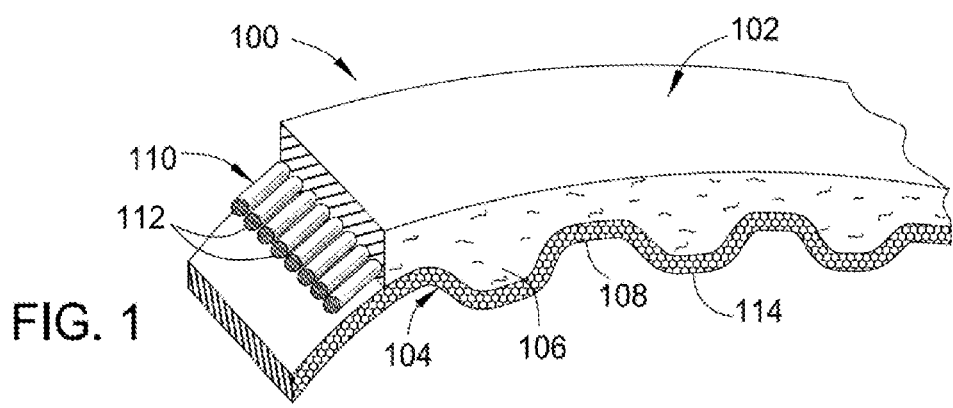
FIG. 1 is a fragmented perspective view of a transmission belt in accordance with some embodiments of the present disclosure.

Embodiments of the present disclosure include compositions comprising a PEDM terpolymer and optionally an ethylene-based copolymer. It has been discovered that compositions of the present disclosure provide improved green tack, tack aging, and green strength. These improved properties provide hoses, roofing, and belts, such as conveyer or transmission belts having improved properties for better use and improved manufacturing of the hoses, roofing, and belts.

Definitions

As used herein, the term "copolymer" is meant to include polymers having two or more monomers. The term "polymer" as used herein includes, but is not limited to, homopolymers, copolymers, terpolymers, etc., and alloys and blends thereof. The term "terpolymer" as used herein refers to a polymer synthesized from three different monomers. Terpolymers, in some embodiments, may be produced (1) by mixing all three monomers at the same time or (2) by sequential introduction of the different comonomers. The mixing of comonomers may be done in one, two, or possible three different reactors in series and/or in parallel. The term "polymer" as used herein also includes impact, block, graft, random, gradient, and alternating copolymers. The term "polymer" shall further include all possible geometrical configurations unless otherwise specifically stated. Such configurations may include isotactic, syndiotactic and random (i.e., atactic) symmetries.

The term "blend" as used herein refers to a mixture of two or more polymers. Blends may be produced by, for example, solution blending, melt mixing, or compounding in a shear mixer. Solution blending is common for making adhesive formulations comprising baled butyl rubber, tackifier, and oil. Then, the solution blend is coated on a fabric substrate, and the solvent evaporated to leave the adhesive.

The term "monomer" or "comonomer," as used herein, can refer to the monomer used to form the polymer (i.e., the unreacted chemical compound in the form prior to polymerization) and can also refer to the monomer after it has been incorporated into the polymer, also referred to herein as a "[monomer]-derived unit". Different monomers are discussed herein, including propylene monomers, ethylene monomers, and diene monomers.

As used herein, the term "ethylene-based copolymer" includes copolymers derived from ethylene, an α-olefin having 3 or more carbon atoms (e.g., 3-12 carbon atoms or 6-10 carbon atoms), and optionally a diene. In preferred embodiments, the ethylene-based copolymer is an ethylene-propylene copolymer or ethylene-propylene-diene polymer.

As used herein, an "ethylene-propylene-diene polymer" (EP(D)M) is defined to be a copolymer having an ethylene content (derived from ethylene monomers) and a propylene content (derived from propylene monomers), and optionally a diene content (derived from diene monomers, preferably non-conjugated diene monomers). The ethylene content can be from 40 wt % to 95 wt % (e.g., 41 wt % to 95 wt %, or 45 wt % to 90 wt %, or 50 wt % to 80 wt %), the diene content is 0 wt % to 10 wt %, and the balance (i.e., the remaining wt % of the polymer) is primarily (e.g., allowing for minor impurities) or entirely propylene content, based on the weight of the polymer. An EP(D)M may have a Mooney viscosity, (ML, 1+4 @ 125° C.) (measured according to ASTM D1646-17) of 15 to 100. The terms "EP(D)M" and "EPDM" are used interchangeably and have the same meaning, unless specified otherwise in context (e.g., where the polymer is referred to as definitively comprising diene monomer(s)).

The term "propylene-α-olefin-diene terpolymer" as used herein includes a polymer derived from propylene, an α-olefin (most preferably ethylene), and diene monomers. Propylene-α-olefin-diene terpolymers may be referred to by the shorthand PEDM, even though α-olefins instead of, or in addition to, ethylene are contemplated as comonomers in such terpolymers, and/or polyenes instead of, or in addition to, dienes are contemplated. Preferably, the PEDM terpolymer comprises a 70 wt % to 97.5 wt % (e.g., 60 wt % to 89 wt %, or 85 wt % to 95 wt %) propylene content (derived from propylene monomers), a 2.5 wt % to 30 wt % (e.g., 2.5 wt % to 20 wt %, or 7.5 wt % to 30 wt %) ethylene content (derived from ethylene monomers) and a 0.5 wt % to 10 wt % (e.g., 3.5 wt % to 10 wt %, or 2.5 wt % to 7 wt %) diene content (derived from diene monomers).

As used herein, "phr" means "parts per hundred parts rubber," where the "rubber" is the total rubber content of the composition. Herein, both PEDM and ethylene-based copolymer (e.g., EP(D)M) are considered to contribute to the total rubber content, such that in compositions where both are present, the "total rubber" is the combined weight of PEDM and ethylene-based copolymer. Thus, for example, a composition having 30 parts by weight of PEDM and 70 parts by weight of ethylene-based copolymer may be referred to as having 30 phr PEDM and 70 phr ethylene-based copolymer. Other components added to the composition are calculated on a phr basis. For example, addition of 50 phr of oil to a composition means that 50 g of oil are present in the composition for every 100 g of PEDM and ethylene-based copolymer combined. Unless specified otherwise, phr should be taken as phr on a weight basis.

As used herein, "tensile strength" means the amount of stress applied to a sample to break the sample. It can be expressed in Pascals or pounds per square inch (psi). ASTM D412-16 can be used to determine tensile strength of a polymer.

"Mooney viscosity" as used herein is the Mooney viscosity of a polymer or polymer composition. The polymer composition analyzed for determining Mooney viscosity should be substantially devoid of solvent. For instance, the sample may be placed on a boiling-water steam table in a hood to evaporate a large fraction of the solvent and unreacted monomers, and then, dried in a vacuum oven overnight (12 hours, 90° C.) prior to testing, in accordance with laboratory analysis techniques, or the sample for testing may be taken from a devolatilized polymer (i.e., the polymer post-devolatilization in industrial-scale processes). Unless otherwise indicated, Mooney viscosity is measured using a Mooney viscometer according to ASTM D1646-17, but with the following modifications/clarifications of that procedure. First, sample polymer is pressed between two hot plates of a compression press prior to testing. The plate temperature is 125° C.+/−10° C. instead of the 50+/−5° C. recommended in ASTM D1646-17, because 50° C. is unable to cause sufficient massing. Further, although ASTM D1646-17 allows for several options for die protection, should any two options provide conflicting results, PET 36 micron should be used as the die protection. Further, ASTM D1646-17 does not indicate a sample weight in Section 8; thus, to the extent results may vary based upon sample weight, Mooney viscosity determined using a sample weight of 21.5+/−2.7 g in the D1646-17 Section 8 procedures will govern. Finally, the rest procedures before testing set forth in D1646-17 Section 8 are 23+/−3° C. for 30 min in air; Mooney values as reported herein were determined after resting at 24+/−3° C. for 30 min in air. Samples are placed on either side of a rotor according to the ASTM D1646-17 test method; torque required to turn the viscometer motor at 2 rpm is measured by a transducer for determining the Mooney viscosity. The results are reported as Mooney Units (ML, 1+4 @ 125° C.), where M is the Mooney viscosity number, L denotes large rotor (defined as ML in ASTM D1646-17), 1 is the pre-heat time in minutes, 4 is the sample run time in minutes after the motor starts, and 125° C. is the test temperature. Thus, a Mooney viscosity of 90 determined by the aforementioned method would be reported as a Mooney viscosity of 90 MU (ML, 1+4 @ 125° C.). Alternatively, the Mooney viscosity may be reported as 90 MU; in such instance, it should be assumed that the just-described method is used to determine such viscosity, unless otherwise noted. In some instances, a lower test temperature may be used (e.g., 100° C.), in which case Mooney is reported as Mooney Viscosity (ML, 1+4 @ 100° C.), or @ T° C. where T is the test temperature.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be a radical, which contains hydrogen atoms and up to 50 carbon atoms and which may be linear, branched, or cyclic, and when cyclic, aromatic or non-aromatic.

Substituted hydrocarbyl radicals are radicals in which at least one hydrogen atom has been replaced with at least one functional group, such as $NR^x_2$, $OR^x$, $SeR^x$, $TeR^x$, $PR^x_2$, $AsR^x_2$, $SbRx_2$, $SR^x$, $BR^x$ and the like or where at least one non-hydrocarbon atom or group has been inserted within the hydrocarbyl radical, such as —O—, —S—, —Se—, —Te—, —N($R^x$)—, =N—, —P($R^x$)—, =P—, —As($R^x$)—, =As—, —Sb($R^x$)—, =Sb—, —B($R^x$)—, =B— and the like, where $R^x$ is independently a hydrocarbyl or halocarbyl radical, and two or more $R^x$ may join together to form a substituted or unsubstituted saturated, partially unsaturated or aromatic cyclic or polycyclic ring structure. Examples of substituted hydrocarbyl include —$CH_2CH_2$—O—$CH_3$ and —$CH_2$—$NMe_2$ where the radical is bonded via the carbon atom, but would not include groups where the radical is bonded through the heteroatom such as —$OCH_2CH_3$ or —$NMe_2$.

Silylcarbyl radicals are radicals in which one or more hydrocarbyl hydrogen atoms have been substituted with at least one $SiR^*_3$ containing group or where at least one —Si($R^*$)$_2$— has been inserted within the hydrocarbyl radical where $R^*$ is independently a hydrocarbyl or halocarbyl radical, and two or more $R^*$ may join together to form a substituted or unsubstituted saturated, partially unsaturated or aromatic cyclic or polycyclic ring structure.

Substituted silylcarbyl radicals are radicals in which at least one hydrogen atom has been substituted with at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$GeR^*_3$, —$SnR^*_3$, —$PbR^*_3$ and the like or where at least one non-hydrocarbon atom or group has been inserted within the silylcarbyl radical, such as —O—, —S—, —Se—, —Te—, —N($R^*$)—, =N—, —P($R^*$)—, =P—, —As($R^*$)—, =As—, —Sb($R^*$)—, =Sb—, —B($R^*$)—, =B—, —Ge($R^*$)$_2$—, —Sn($R^*$)$_2$—, —Pb($R^*$)$_2$— and the like, where $R^*$ is independently a hydrocarbyl or halocarbyl radical, and two or more $R^*$ may join together to form a substituted or unsubstituted saturated, partially unsaturated or aromatic cyclic or polycyclic ring structure. Substituted silylcarbyl radicals are only bonded via a carbon or silicon atom.

Germylcarbyl radicals are radicals in which one or more hydrocarbyl hydrogen atoms have been substituted with at least one $GeR^*_3$ containing group or where at least one —Ge($R^*$)$_2$— has been inserted within the hydrocarbyl radical where $R^*$ is independently a hydrocarbyl or halocarbyl radical, and two or more $R^*$ may join together to form a substituted or unsubstituted saturated, partially unsaturated or aromatic cyclic or polycyclic ring structure. Substituted germylcarbyl radicals are only bonded via a carbon or germanium atom.

Substituted germylcarbyl radicals are radicals in which at least one hydrogen atom has been substituted with at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$SnR^*_3$, —$PbR^*_3$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g., F, Cl, Br, I) or halogen-containing group (e.g., CF$_3$).

Substituted halocarbyl radicals are radicals in which at least one halocarbyl hydrogen or halogen atom has been substituted with at least one functional group such as NR*$_2$, OR*, SeR*, TeR*, PR*$_2$, AsR*$_2$, SbR*$_2$, SR*, BR*$_2$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure. Substituted halocarbyl radicals are only bonded via a carbon atom.

A heteroatom is an atom other than carbon or hydrogen.

The term "aryl" or "aryl group" means a monocyclic or polycyclic aromatic ring and the substituted variants thereof, including phenyl, naphthyl, 2-methyl-phenyl, xylyl, 4-bromo-xylyl. Likewise, "heteroaryl" is an aryl group where a ring carbon atom (or two or three ring carbon atoms) has been replaced with a heteroatom, such as N, O, or S. The term "substituted aryl" means: 1) an aryl group where a hydrogen has been replaced by a substituted or unsubstituted hydrocarbyl group, a substituted or unsubstituted halocarbyl group, a substituted or unsubstituted silylcarbyl group, or a substituted or unsubstituted germylcarbyl group. The term "substituted heteroaryl" means: 1) a heteroaryl group where a hydrogen has been replaced by a substituted or unsubstituted hydrocarbyl group, a substituted or unsubstituted halocarbyl group, a substituted or unsubstituted silylcarbyl group, or a substituted or unsubstituted germylcarbyl group.

For nomenclature purposes, the following numbering schemes are used for indenyl, tetrahydro-s-indacenyl and tetrahydro-as-indacenyl ligands.

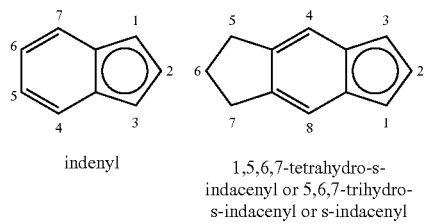

indenyl 1,5,6,7-tetrahydro-s-indacenyl or 5,6,7-trihydro-s-indacenyl or s-indacenyl

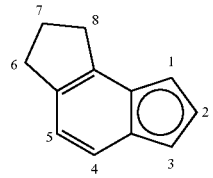

3,6,7,8-trihydro-as-indacenyl or 6,7,8-trihydro-as-indacenyl or as-indacenyl

As used herein, Mn is number average molecular weight, Mw is weight average molecular weight, and Mz is z average molecular weight, wt. % is weight percent, and mol % is mol percent. Molecular weight distribution (MWD), also referred to as polydispersity, is defined to be Mw divided by Mn. Unless otherwise noted, all molecular weight units (e.g., Mw, Mn, Mz) are g/mol.

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, Cp is cyclopentadienyl, Ind is indenyl, Flu is fluorenyl, and MAO is methylalumoxane.

For purposes of the present disclosure, a "catalyst system" is the combination of at least one catalyst compound, at least one activator, an optional co-activator, and an optional support material. For the purposes of the present disclosure, when catalyst systems are described as comprising neutral stable forms of the components, it is well understood by one of ordinary skill in the art, that the ionic form of the component is the form that reacts with the monomers to produce polymers. For the purposes of the present disclosure, "catalyst system" includes both neutral and ionic forms of the components of a catalyst system, such as the catalyst compounds.

In the description herein, the catalyst may be described as a catalyst precursor, a pre-catalyst, a pre-catalyst compound, a metallocene catalyst compound, a metallocene catalyst, or a transition metal compound, and these terms are used interchangeably.

A metallocene catalyst is defined as an organometallic transition metal compound with at least one π-bound cyclopentadienyl moiety (or substituted cyclopentadienyl moiety) bound to a transition metal.

For purposes of the present disclosure, in relation to metallocene catalyst compounds, the term "substituted" means that one or more hydrogen atoms have been replaced with a hydrocarbyl, heteroatom (such as a halide), or a heteroatom containing group, (such as silylcarbyl, germylcarbyl, halocarbyl, etc.). For example, methyl cyclopentadiene (Cp) is a Cp group substituted with a methyl group. Two or more adjacent hydrogen atoms may be replaced by a hydrocarbdiyl to form a multi-ring cyclopentadienyl moiety for example, indenyl, fluorenyl, tetrahydro-s-indacenyl and the like.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

Numerical ranges used herein include the numbers recited in the range. For example, the numerical range "from 1 wt % to 10 wt %" includes 1 wt % and 10 wt % within the recited range.

Compositions

Compositions of the present disclosure comprise one or more PEDM terpolymers and, optionally, one or more ethylene-based copolymers. In some embodiments, compositions of the present disclosure comprise an amount (e.g., from 1 phr to 100 phr of a composition) of a PEDM terpolymer and optionally an amount (e.g., from 0 phr to 99 phr of a composition) of an ethylene-based copolymer. Compositions of the present disclosure can comprise the one or more PEDM terpolymers in an amount of from 1 phr to 100 phr. Further examples of the amount of one or more PEDM terpolymer suitable for use include: from 1 phr to 75 phr, from 1 phr to 50 phr, from 1 phr to 40 phr, from 3 phr to 40 phr, from 5 phr to 40 phr, or from 10 phr to 30 phr, with a balance to 100 phr being the one or more ethylene-based copolymers.

PEDM Terpolymers

Compositions described herein can comprise a single PEDM terpolymer or a mixture of two or more PEDM terpolymers (e.g., a dual reactor product or physical blend). In some instances, the PEDM terpolymers may be referred to as a "first PEDM terpolymer" and a "second PEDM terpolymer" for clarity. However, it should be understood that just because "first PEDM terpolymer" is mentioned, it is not implied or intended to mean that a "second PEDM terpolymer" is necessarily present in the composition unless it is stated as such. In addition, PEDM terpolymers of the compositions of the present disclosure may also be categorized into at least 2 categories based on their composition. In the present disclosure, the designations PEDM-1 and PEDM-2 are used for greater clarity. The compositional characteristics of PEDM-1 and PEDM-2 terpolymers are described in greater detail herein. Compositions of the present disclosure may further include mixtures of PEDM-1 terpolymers, optionally with one or more PEDM-2 terpolymers.

In instances, PEDM-1 terpolymers of the present disclosure may have from 3.5 wt % to 20 wt % polyene (preferably diene) content, 7.5 wt % to 30 wt % $C_2$ or $C_4$ to $C_{12}$ α-olefin (preferably ethylene) content, and 70 wt % to 92.5 wt % propylene content, said wt % s based on the weight of the PEDM-1 terpolymer.

PEDM-1 terpolymers of the present disclosure comprise from 70 wt % to 92.5 wt % propylene, based on the weight of the PEDM-1 terpolymer. Other preferred ranges of pro- pylene content include from_70 wt % to 91.5_wt %, or 70_wt % to_89.9 wt %, or 70_wt % to_79 wt %, or 75_wt % to_79 wt %, based on the weight of the PEDM-1 terpolymer.

PEDM-1 terpolymers of the present disclosure comprise from 7.5 wt % to 30 wt % C2 or C4 to C12 α-olefin comonomer (preferably ethylene), based on the weight of the first PEDM terpolymer. Other preferred ranges of α-olefin (e.g., ethylene) content include from 8.5 wt % to 30 wt %, or 10.1 wt % to 30 wt %, or 21 wt % to 30 wt %, or 21 wt % to 25 wt %, based on the weight of the PEDM-1 terpolymer. C2 or C4 to C12 α-olefin comonomers include, but are not limited to, ethylene, butylene, pentylene, hexylene, heptylene, octylene, nonylene, decylene, undecylene, dodecylene, and branched isomers thereof. Ethylene is particularly preferred.

PEDM-1 terpolymers of the present disclosure comprise a polyene content (preferably diene content) of from 3.5 wt % to 20 wt %, 3.5 wt % to 10 wt % or 4 wt % to 10 wt %, or 4 wt % to 8 wt %, or 4 wt % to 6 wt %, based on the weight of the PEDM-1 terpolymer. In at least one embodiment, the diene is 5-ethylidene-2-norbornene content in an amount of 3.5 wt % to 20 wt %, 3.5 wt % to 10 wt %, or 4 wt % to 10 wt %, or 4 wt % to 8 wt %, or 4 wt % to 6 wt %, based on the weight of the PEDM-1 terpolymer.

In instances, PEDM-2 terpolymers of the present disclosure may have from 0.5 wt % to 7.5 wt % polyene (preferably diene) content, 1 wt % to 7 wt % $C_2$ or $C_4$ to $C_{12}$ α-olefin (preferably ethylene) content, and 93 wt % to 99 wt % propylene content, said wt % s based on the weight of the PEDM-2 terpolymer.

PEDM-2 terpolymers of the present disclosure comprise from 93 wt % to 99 wt % propylene, based on the weight of the PEDM-2 terpolymer. Other preferred ranges of propylene a) content include from 93 wt % to 98 wt %, or 93 wt % to 97 wt %, or 94 wt % to 97 wt %, or 94 wt % to 96 wt %, based on the weight of the PEDM-2 terpolymer.

PEDM-2 terpolymers of the present disclosure comprise from 1 wt % to 7 wt % $C_2$ or C4 to C12 α-olefin comonomer (preferably ethylene), based on the weight of the PEDM-2 terpolymer. Other preferred ranges of α-olefin (e.g., ethylene) content include from 2 wt % to 7 wt %, or 3 wt % to 7 wt %, or 4 wt % to 7 wt %, or 4 wt % to 6 wt %, based on the weight of the PEDM-2 terpolymer. C2 or C4 to C12 α-olefin comonomers include, but are not limited to, ethylene, butylene, pentylene, hexylene, heptylene, octylene, nonylene, decylene, undecylene, dodecylene, and branched isomers thereof. Ethylene is particularly preferred.

PEDM-2 terpolymers of the present disclosure comprise a polyene content (preferably diene content) of from 0.5 wt % to 7.5 wt %, or 1 wt % to 7.5 wt %, or 2 wt % to 7.5 wt %, or 2 wt % to 6 wt %, or 2 wt % to 4 wt %, based on the weight of the PEDM-2 terpolymer. In at least one embodiment, the diene is 5-ethylidene-2-norbornene content in an amount of 0.5 wt % to 7.5 wt %, or 1 wt % to 7.5 wt %, or 2 wt % to 7.5 wt %, or 2 wt % to 6 wt %, or 2 wt % to 4 wt %, based on the weight of the PEDM-2 terpolymer.

Wt. % of C2, wt. % of $C_3$-$C_{16}$ olefin and wt. % of diene can be measured by $^{13}C$ NMR and in some cases by $^1H$ NMR. Wt. % numbers throughout this document are uncorrected numbers wherein wt. % of $C_2$ plus wt. % of $C_3$-$C_{16}$ olefin equals 100%, unless specifically referred to as being corrected.

For ethylene-propylene and ethylene-propylene-diene copolymers, FTIR is typically used to measure ethylene and diene content (when present), using ASTM D3900 and ASTM D6047. The former provides uncorrected $C_2$ wt. % values.

The corrected wt. % of $C_2$ can be calculated from uncorrected wt. % $C_2$ using the equation below:

$$\text{Corrected wt. \% } C_2 = [\text{uncorrected wt. \% } C_2 \times (100 - \text{wt. \% diene})]/100$$

where the wt. % of ethylene and wt. % of diene are determined by FTIR or by NMR methods.

When the $C_3$-$C_{16}$ olefin is propylene, ASTM D3900 is followed to determine propylene content. When the diene is ENB, ASTM D6047 is followed to determine ENB content. If ASTM established IR methods are not available for other $C_3$-$C_{16}$ olefins, and/or other dienes, $^{13}C$ NMR may be used.

For purposes of the present disclosure, the mole fractions of ethylene, $C_3$-$C_{16}$ olefin, and diene are calculated using the following equations A, B, and C, respectively:

$$C_2 \text{ mole fraction} = \frac{\frac{\text{wt. \% } C_2}{Mw(C_2)}}{\frac{\text{wt. \% } C_2}{Mw(C_2)} + \frac{100 - \text{wt. \% } C_2 - \text{wt. \% diene}}{Mw(C_3-C_{16} \text{ olefin})} + \frac{\text{wt. \% diene}}{Mw(\text{diene})}} \quad \text{Equation (A)}$$

$$C_3-C_{16} \text{ mole fraction} = \frac{\frac{100 - \text{wt. \% } C_2 - \text{wt. \% diene}}{Mw(C_3-C_{16} \text{ olefin})}}{\frac{\text{wt. \% } C_2}{Mw(C_2)} + \frac{100 - \text{wt. \% } C_2 - \text{wt. \% diene}}{Mw(C_3-C_{16} \text{ olefin})} + \frac{\text{wt. \% diene}}{Mw(\text{diene})}} \quad \text{Equation (B)}$$

$$\text{Diene mole fraction} = \frac{\frac{\text{wt. \% diene}}{Mw(\text{diene})}}{\frac{\text{wt. \% } C_2}{Mw(C_2)} + \frac{100 - \text{wt. \% } C_2 - \text{wt. \% diene}}{Mw(C_3-C_{16} \text{ olefin})} + \frac{\text{wt. \% diene}}{Mw(\text{diene})}} \quad \text{Equation (C)}$$

where "$Mw(C_2)$" is the molecular weight of ethylene in g/mol, "$Mw(C_3-C_{16} \text{ olefin})$" is the molecular weight of the $C_3-C_{16}$ olefin in g/mol, "$Mw(\text{diene})$" is the molecular weight of diene in g/mol, and "wt. % $C_2$" is corrected wt. % of $C_2$.

The polyenes used in the PEDM-1 and PEDM-2 terpolymers, as noted, are preferably (but not necessarily) dienes. Suitable dienes may be conjugated or non-conjugated. Preferably, the dienes are non-conjugated. Dienes include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB.

PEDM terpolymers of the present disclosure may have a weight average molecular weight (Mw) of 5,000,000 or less, a number average molecular weight (Mn) of 3,000,000 or less, and/or a z-average molecular weight (Mz) of 10,000,000 or less. In embodiments with a mixture of PEDM terpolymers, the molecular weight distribution of the PEDM terpolymers may have at two or more modes (e.g., bimodal). The distributions and the moments of molecular weight (number average molecular weight (Mn), weight average molecular weight (Mw), and z-average molecular weight (Mz), Mw/Mn, etc.) can be determined by using a Gel Permeation Chromatography (GPC)

PEDM terpolymers of the present disclosure may have an Mw of from 5,000 g/mol to 5,000,000 g/mol, or from 10,000 g/mol to 1,000,000 g/mol, or from 20,000 g/mol to 500,000 g/mol, or from 50,000 g/mol to 400,000 g/mol. The PEDM terpolymer may have an Mn of 2,500 g/mol to 2,500,000 g/mol, or from 5,000 g/mol to 500,000 g/mol, or from 10,000 g/mol to 250,000 g/mol, or from 25,000 g/mol to 200,000 g/mol. The PEDM terpolymer may have an Mz of 10,000 g/mol to 7,000,000 g/mol, or from 50,000 g/mol to 1,000,000 g/mol, or from 80,000 g/mol to 700,000 g/mol, or from 100,000 g/mol to 500,000 g/mol. In embodiments with a mixture of PEDM terpolymers, the molecular weight distribution of the PEDM terpolymers may have at two or more modes (e.g., bimodal) with each mode being characterized by one of the foregoing Mw, Mn, and/or Mz values.

The molecular weight distribution index (MWD=(Mw/Mn)) of PEDM terpolymers of the present disclosure may be from 1.5 to 40. For example, a PEDM terpolymer may have an MWD from 1.5 to 40, or from 1.8 to 20, or from 2.0 to 10, or from 2.0 to 5, or from 3 to 4.5. In one or more embodiments, the MWD of a PEDM terpolymer is 1.8 to 5, or from 1.8 to 3. For purposes of this disclosure, the Mw, Mn and Mz will be defined as measured by a LS detector.

The ratio of Mw/Mn of PEDM terpolymers of the present disclosure may be from 1.5 to 3.5, or from 1.5 to 2.5, or from 1.75 to 2.25.

PEDM terpolymers of the present disclosure may have a density of from 0.85 $g/cm^3$ to 0.92 $g/cm^3$, or from 0.87 $g/cm^3$ to 0.90 $g/cm^3$, or from 0.88 $g/cm^3$ to 0.89 $g/cm^3$, at room temperature as measured per the ASTM D1505-10 test method.

PEDM terpolymers of the present disclosure may have a melt flow rate (MFR, 2.16 kg weight at 230° C.), equal to or greater than 0.1 g/10 min as measured according to the ASTM D1238-13. For example, the MFR (2.16 kg at 230° C.) for the PEDM terpolymers of the present disclosure may be from 0.1 g/10 min to 10 g/10 min, or from 0.1 g/10 min to 5 g/10 min, or from 1 g/10 min to 7 g/10 min, or from 5 g/10 min to 10 g/10 min.

PEDM terpolymers of the present disclosure may have a Mooney viscosity (ML, 1+4 @ 125° C.) of 10 MU to 100 MU, or 10 MU to 40 MU, or 10 MU to 60 MU, or 20 MU to 60 MU, or 25 MU to 80 MU, or 30 MU to 100 MU. In some instances, PEDM-1 terpolymers have a Mooney viscosity of 25 MU to 100 MU, or 30 MU to 100 MU, or 35 MU to 100 MU, or 41 MU to 100 MU, or 50 MU to 100 MU, or 61 MU to 100 MU. PEDM-2 terpolymers may have a Money viscosity of 10 MU to 50 MU, or 10 MU to 40 MU or 10 MU to 30 MU, or 10 MU to 20 MU.

PEDM terpolymers of the present disclosure can have a heat of fusion ($H_f$) of less than 1 J/g. In at least one embodiment, PEDM terpolymers are amorphous. Additionally or alternatively, PEDM terpolymers can have atactic propylene sequences. In at least one embodiment, a PEDM terpolymer has a glass transition temperature (Tg) from −45° C. to −2° C., or from −35° C. to −30° C. In at least one embodiment, the PEDM terpolymers can have a $H_f$ of less than 1 J/g and syndiotactic r diads where the percentage of r diads is low enough to still be substantially amorphous (i.e., have the low $H_f$). $H_f$ and Tg can be determined by differential scanning calorimetry (DSC)

PEDM terpolymers of the present disclosure preferably have atactic polypropylene sequences. Also or instead, they are preferably amorphous, meaning they will exhibit no melting peak when subjected to differential scanning calorimetry (DSC) testing. Alternatively, PEDM according to some embodiments may exhibit minor melting peak, such that they may be observed to have Hf<1 J/g according to the DSC methodology described herein. Further, where a PEDM exhibits any melting peak, such peak may be a single peak, or the PEDM may show secondary melting peaks adjacent to the principal peak. For purposes herein, such secondary melting peaks are considered together as a single melting point, with the highest of these peaks (relative to baseline as described herein) being considered as the melting point of the PEDM terpolymer.

According to yet further embodiments, the crystallinity of PEDM terpolymers may be expressed in terms of percentage of crystallinity (i.e., % crystallinity), as determined according to the DSC procedure described herein. Although PEDM according to certain embodiments is amorphous (and may therefore be said to have 0% crystallinity), if a PEDM according to various other embodiments exhibits any crystallinity, it preferably has a % crystallinity of from 0.1% to 5%, preferably 0.1% to 3%. (The degree of crystallinity is determined by dividing (i) heat of fusion measured by (ii) the heat of fusion for 100% crystalline polyethylene, which has the value of 293 J/g (B. Wunderlich, Thermal Analysis, Academic Press, 1990, pp. 417-431).)

The tacticity of an α-olefin-ethylene-diene polymer is measured by $^{13}$C NMR.

Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

The "propylene tacticity index", expressed herein as [m/r], is calculated as defined in H. N. Cheng, *Macromolecules*, 17, p. 1950 (1984). When [m/r] is 0 to less than 1.0, the polymer is generally described as syndiotactic, when [m/r] is 1.0 the polymer is atactic, and when [m/r] is greater than 1.0 the polymer is generally described as isotactic. The [m/r] region from 0 to 1.0 is a continuum with polymers having a value closer to zero being more syndiotactic and those having a value closer to one being more atactic like. The phrases "propylene tacticity index", "tacticity index" and "$C_{3+}$olefin tacticity index" are used interchangeably.

For polypropylene, the "mm triad tacticity index" of a polymer is a measure of the relative isotacticity of a sequence of three adjacent propylene units connected in a head-to-tail configuration. More specifically, in the present invention, the mm triad tacticity index (also referred to as the "mm Fraction") of a polypropylene homopolymer or copolymer is expressed as the ratio of the number of units of meso tacticity to all of the propylene triads in the copolymer:

$$\text{mm Fraction} = \frac{PPP(\text{mm})}{PPP(\text{mm}) + PPP(mr) + PPP(rr)}$$

where PPP(mm), PPP(mr) and PPP(rr) denote peak areas derived from the methyl groups of the second units in the possible triad configurations for three head-to-tail propylene units, shown below in Fischer projection diagrams:

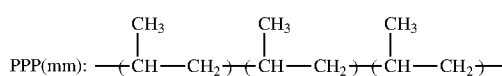

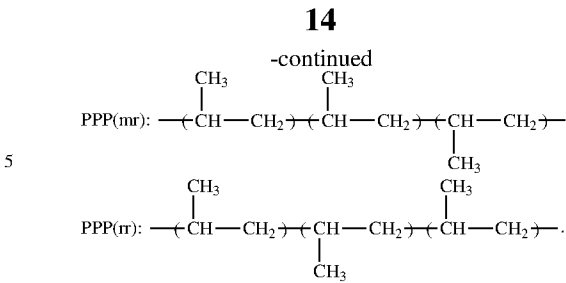

The "rr triad tacticity index" of a polymer is a measure of the relative syndiotacticity of a sequence of three adjacent propylene units connected in a head-to-tail configuration. More specifically, in the present invention, the rr triad tacticity index (also referred to as the "rr Fraction") of a polypropylene homopolymer or copolymer is expressed as the ratio of the number of units of racemic tacticity to all of the propylene triads in the copolymer:

$$rr \text{ Fraction} = \frac{PPP(\text{mm})}{PPP(\text{mm}) + PPP(mr) + PPP(rr)}.$$

The calculation of the mm Fraction of a propylene polymer is described in U.S. Pat. No. 5,504,172 (homopolymer: column 25, line 49 to column 27, line 26; copolymer: column 28, line 38 to column 29, line 67). For further information on how the mm triad tacticity can be determined from a $^{13}$C-NMR spectrum, see 1) J. A. Ewen, Catalytic Polymerization of Olefins: Proceedings of the International Symposium on Future Aspects of Olefin Polymerization, T. Keii and K. Soga, Eds. (Elsevier, 1986), pp. 271-292; and 2) U.S. Patent Application Publication No. US2004/054086 (paragraphs [0043] to [0054]).

Similarly m diads and r diads can be calculated as follows where mm, mr and mr are defined above:

$m=mm+\frac{1}{2}mr$ $r=rr+\frac{1}{2}mr$.

Preferably, the "propylene tacticity index" [m/r] of an α-olefin-ethylene-diene polymer of the present disclosure is greater than 0.30, alternatively greater than 0.40, alternatively greater than 0.50, and with an upper limit of 1.2, alternatively 1.1, alternatively, 1.0, alternatively 0.9.

Analogous calculations can be done for other $C_{3+}$olefin polymers including those with a low content of ethylene. For further information see J. C. Randall, Polymer Reviews, "A Review of High Resolution liquid $^{13}$C NMR Characterizations of ethylene-based polymers" (1989) 29:2 201-317.

Further, as mentioned above, where the sample exhibits no melting peak, as in the case of amorphous polymers, it may be said to have no Hf. However, even some amorphous or near-amorphous PEDM samples might exhibit a minor melting peak, e.g., such that Hf on the first melt may be observed as <1 J/g. Therefore, for purposes of the present application, a PEDM may be considered amorphous when it has Hf<1 J/g, or alternatively when it exhibits no discernable melting peak. For example, PEDM terpolymers described herein may have a Hf, as measured from the first heating cycle after annealing for example at 140° C. for 5 minutes and then aging at room temperature for 1 hour, or 1 day, or 1 week, or 4 weeks, or 3 months by the DSC procedure described herein of <1 J/g.

PEDM terpolymers of some embodiments can have a Tg, as determined by the DSC procedure described herein, from −45° C. to −2° C., or from −40° C. to −25° C., −40° C. to −20° C., −35° C. to −25° C., −40° C. to −15° C., or −35° C. to −15° C.; or alternatively from −20° C. to −2° C., or from −15° C. to −2° C., or from −10° C. to −2° C., or from −5° C. to −2° C.

The PEDM terpolymers of the present disclosure may have a Tg (° C.) greater than or equal to −7.386−(87.98*E)+(294*D) and less than or equal to −1.386−(87.98*E)+(294*D) wherein E is the mole fraction of ethylene in the polymer and D is the mole fraction of diene in the polymer. The PEDM terpolymers of the present disclosure may have a Tg (° C.) greater than or equal to −6.886−(87.98*E)+(294*D) and less than or equal to −1.886−(87.98*E)+(294*D) wherein E is the mole fraction of ethylene in the polymer and D is the mole fraction of diene in the polymer.

The PEDM terpolymers may be made by a polymerization process including contacting propylene, a C2, C4-12 α-olefin (such as ethylene), and diene (such as ENB) with a catalyst system comprising an activator, optional support, and a catalyst compound. The catalyst compound, optional support and activator may be combined in any order, and are combined typically prior to contacting the catalyst system with the monomers.

Polymerization processes of the present disclosure can be carried out in any suitable manner, such as any suitable suspension, homogeneous, bulk, solution, slurry, or gas phase polymerization process. Such processes can be run in a batch, semi-batch, or continuous mode. Gas phase polymerization processes and slurry processes are preferred. Additional description of processes for making the PEDM terpolymers is described in PCT/US2019/022738, filed Mar. 18, 2019, and PCT/US2019/022764, filed on Mar. 18, 2019, both of which are incorporated herein by reference in their entirety.

The present disclosure provides polymerization processes where propylene, C2, C4-C12 olefin (such as ethylene), and diene (such as ENB) are contacted with a catalyst system comprising an activator, optional support, and a catalyst compound. The catalyst compound, optional support and activator may be combined in any order, and are combined typically prior to contacting the catalyst system with the monomer. In at least one embodiment, the catalyst compound is represented by formula (I):

$$T_y Cp'_m M G_n X_q \quad (I)$$

wherein:
Cp' is a tetrahydroindacenyl group (such as tetrahydro-s-indacenyl or tetrahydro-as-indacenyl) which is optionally substituted or unsubstituted, provided that when Cp' is tetrahydro-s-indacenyl: 1) the 3 and/or 4 positions are not aryl or substituted aryl, 2) the 3 position is not directly bonded to a group 15 or 16 heteroatom, 3) there are no additional rings fused to the tetrahydroindacenyl ligand, 4) T is not bonded to the 2-position, and 5) the 5, 6, or 7-position (preferably the 6 position) is geminally disubstituted, preferably with two $C_1$-$C_{10}$ alkyl groups; M is a group 2, 3, 4, 5, or 6 transition metal, preferably group 4 transition metal, for example titanium, zirconium, or hafnium (preferably titanium);
T is a bridging group (such as dialkylsilylene, dialkylcarbylene, phen-1,2-diyl, substituted phen-1,2-diyl, cyclohex-1,2-diyl or substituted cyclohex-1,2-diyl). T is preferably $(CR^8R^9)_x$, $SiR^8R^9$ or $GeR^8R^9$ where x is 1 or 2, $R^8$ and $R^9$ are independently selected from hydrogen, substituted or unsubstituted hydrocarbyl, halocarbyl, silylcarbyl and germylcarbyl and $R^8$ and $R^9$ may optionally be bonded together to form a ring structure, and in a particular embodiment, $R^8$ and $R^9$ are not aryl);
y is 0 or 1, indicating the absence or presence of T;
G is a heteroatom group represented by the formula $JR^i_{z-y}$ where J is N, P, O or S, $R^i$ is a $C_1$ to $C_{100}$ hydrocarbyl group (such as a $C_1$ to $C_{20}$ hydrocarbyl group), and z is 2 when J is N or P, and z is 1 when J is O or S (preferably J is N and z is 2) ($R^i$ can be a linear, branched or cyclic $C_1$ to $C_{20}$ hydrocarbyl group, preferably independently selected from methyl, ethyl, propyl, butyl, pentyl, hexyl, heptyl, octyl, nonyl, decyl, phenyl, and isomers thereof, including t-butyl, cyclododecyl, cyclooctyl, preferably t-butyl and or cyclododecyl);
X is a leaving group (such as a halide, a hydride, an alkyl group, an alkenyl group or an arylalkyl group) and optionally two or more X may form a part of a fused ring or a ring system; m=1; n=1, 2 or 3; q=1, 2 or 3; and the sum of m+n+q is equal to the oxidation state of the transition metal (preferably 3, 4, 5, or 6, preferably 4); preferably m=1, n=1, q is 2, and y=1.

In at least one embodiment of formula (I), M is a group 4 transition metal (preferably Hf, Ti and/or Zr, preferably Ti). In at least one embodiment of formula (I), $JR^i_{z-y}$ is cyclododecyl amido, t-butylamido, and or 1-adamantyl amido.

In at least one embodiment of formula (I), each X is, independently, selected from hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), preferably each X is independently selected from halides, aryls and $C_1$ to $C_5$ alkyl groups, preferably each X is a benzyl, methyl, ethyl, propyl, butyl, pentyl, or chloro group.

In at least one embodiment of formula (I), the Cp' group may be substituted with a combination of substituent groups R. R includes one or more of hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, arylamino radicals, straight, branched or cyclic, alkylene radicals, or combination thereof. In at least one embodiment, substituent groups R have up to 50 non-hydrogen atoms, preferably from 1 to 30 carbon, that can also be substituted with halogens or heteroatoms or the like, provided that when Cp' is tetrahydro-s-indacenyl: 1) the 3 and/or 4 position is not aryl or substituted aryl, 2) the 3-position is not substituted with a group 15 or 16 heteroatom, 3) there are no additional rings fused to the tetrahydroindacenyl ligand, T is not bonded to the 2-position, and 5) the 5, 6, or 7-position (preferably the 6 position) is geminally disubstituted, preferably with two $C_1$-$C_{10}$ alkyl groups. Non-limiting examples of alkyl substituents R include methyl, ethyl, propyl, butyl, pentyl, hexyl, cyclopentyl, cyclohexyl, benzyl or phenyl groups and the like, including all their isomers, for example, tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as, but not limited to, olefinically unsaturated substituents including vinyl-terminated ligands, for example but-3-enyl, prop-2-enyl, hex-5-enyl and the like.

In at least one embodiment of formula (I), the substituent(s) R are, independently, hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, or a $C_1$ to $C_{20}$ hydrocarbyl substituted with an N, O, S and or P heteroatom or heteroatom containing group (typically having up to 12 atoms, including the N, O, S and P heteroatoms), provided that when Cp' is tetrahydro-s-indacenyl, the 3 and/or 4 position are not aryl or substituted aryl, the 3 position is not substituted with a group 15 or 16 heteroatom, and there are no additional rings fused to the tetrahydroindacenyl ligand, T is not bonded to the 2-position, and the 5, 6, or 7-position (preferably the 6 position) is geminally disubstituted, preferably with two $C_1$-$C_{10}$ alkyl groups.

In at least one embodiment of formula (I), the Cp' group is tetrahydro-as-indacenyl or tetrahydro-s-indacenyl which may be substituted.

y can be 1 where T is a bridging group containing at least one group 13, 14, 15, or 16 element, in particular boron or a group 14, 15 or 16 element. Examples of suitable bridging groups include P(=S)R*, P(=Se)R*, P(=O)R*, R*$_2$C, R*$_2$Si, R*$_2$Ge, R*$_2$CCR*$_2$, R*$_2$CCR*$_2$CR*$_2$, R*$_2$CCR*$_2$CR*$_2$CR*$_2$, R*C=CR*, R*C=CR*CR*$_2$, R*$_2$CCR*=CR*CR*$_2$, R*C=CR*CR*=CR*, R*C=CR*CR*$_2$CR*$_2$, R*$_2$CSiR*$_2$, R*$_2$SiSiR*$_2$, R*$_2$SiOSiR*$_2$, R*$_2$CSiR*$_2$CR*$_2$, R*$_2$SiCR*$_2$SiR*$_2$, R*C=CR*SiR*$_2$, R*$_2$CGeR*$_2$, R*$_2$GeGeR*$_2$, R*$_2$CGeR*$_2$CR*$_2$, R*$_2$GeCR*$_2$GeR*$_2$, R*$_2$SiGeR*$_2$, R*C=CR*GeR*$_2$, R*B, R*$_2$C—BR*, R*$_2$C—BR*—CR*$_2$, R*$_2$C—O—CR*$_2$, R*$_2$CR*$_2$C—O—CR*$_2$CR*$_2$, R*$_2$C—O—CR*$_2$CR*$_2$, R*$_2$C—O—CR*=CR*, R*$_2$C—S—CR*$_2$, R*$_2$CR*$_2$C—S—CR*$_2$CR*$_2$, R*$_2$C—S—CR*$_2$CR*$_2$, R*$_2$CR*$_2$C—S—CR*=CR*, R*$_2$C—Se—CR*$_2$, R*$_2$CR*$_2$C—Se—CR*$_2$CR*$_2$, R*$_2$C—Se—CR*$_2$CR*$_2$, R*$_2$C—Se—CR*=CR*, R*$_2$C—N=CR*, R*$_2$C—NR*—CR*$_2$, R*$_2$C—NR*—CR*$_2$CR*$_2$, R*$_2$C—NR*—CR*=CR*, R*$_2$CR*$_2$C—NR*—CR*$_2$CR*$_2$, R*$_2$C—P=CR*, R*$_2$C—PR*—CR*$_2$, O, S, Se, Te, NR*, PR*, AsR*, SbR*, O—O, S—S, R*N—NR*, R*P—PR*, O—S, O—NR*, O—PR*, S—NR*, S—PR*, and R*N—PR* where R* is hydrogen or a $C_1$-$C_{20}$ containing hydrocarbyl, substituted hydrocarbyl, halocarbyl, substituted halocarbyl, silylcarbyl or germylcarbyl substituent, and optionally two or more adjacent R* may join to form a substituted or unsubstituted, saturated, partially unsaturated or aromatic, cyclic or polycyclic substituent, and optionally any one or more adjacent R* and R' may join to form a substituted or unsubstituted, saturated, partially unsaturated or aromatic, cyclic or polycyclic substituent. Preferred examples for the bridging group T include —CH$_2$—, —CH$_2$CH$_2$—, —SiMe$_2$-, —SiPh$_2$-, —Si(Me)(Ph)-, —Si(CH$_2$)$_3$—, —Si(CH$_2$)$_4$—, —O—, —S—, —N(Ph)-, —P(Ph)-, —N(Me)-, —P(Me)-, —N(Et)-, —N(Pr)—, —N(Bu)-, —P(Et)-, —P(Pr)—, -(Me)$_2$SiOSi(Me)$_2$-, and —P(Bu)-. In a preferred embodiment of the present disclosure, when Cp' is tetrahydro-s-indacenyl and T is R*$_2$Si, then R* is not aryl. In some embodiments, R* is not aryl or substituted aryl.

In at least one embodiment, the catalyst compound is one or more bridged transition metal compounds represented by formula (II):

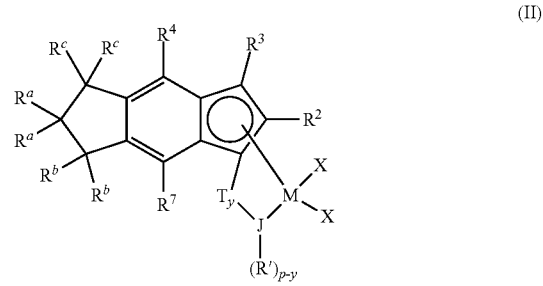

(II)

where M is a group 4 metal (such as Hf, Ti or Zr, preferably Ti);
J is N, O, S or P;
p is 2 when J is N or P, and is 1 when J is O or S (preferably J is N, y=1, and p=2);
each $R^a$ is independently $C_1$-$C_{10}$ alkyl (alternately a $C_2$-$C_{10}$ alkyl);
each $R^b$ and each $R^c$ is independently hydrogen or a $C_1$-$C_{10}$ alkyl (alternately a $C_2$-$C_{10}$ alkyl);
each $R^2$, $R^3$, $R^4$, and $R^7$ is independently hydrogen, or a $C_1$-$C_{50}$ substituted or unsubstituted hydrocarbyl, halocarbyl, silylcarbyl or germylcarbyl, provided that: 1) $R^3$ and/or $R^4$ are not aryl or substituted aryl, 2) $R^3$ is not directly bonded to a group 15 or 16 heteroatom, and 3) adjacent $R^4$, $R^c$, $R^a$, $R^b$, or $R^7$ do not join together to form a fused ring system;
each R' is, independently, a $C_1$-$C_{100}$ substituted or unsubstituted hydrocarbyl, halocarbyl, silylcarbyl or germylcarbyl;
T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

In at least one embodiment, the catalyst compound is one or more bridged transition metal compounds represented by formula (III):

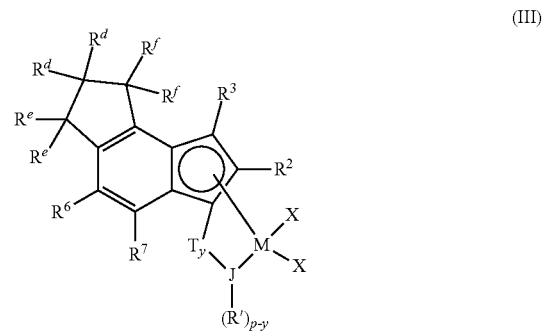

(III)

where M is a group 4 metal (such as Hf, Ti or Zr, preferably Ti);
J is N, O, S or P;
p is 2 when J is N or P, and is 1 when J is O or S (preferably J is N, y=1, and p=2);

each $R^d$, $R^e$ and $R^f$ are independently hydrogen or a $C_1$-$C_{10}$ alkyl (alternately a $C_2$-$C_{10}$ alkyl);

each $R^2$, $R^3$, $R^6$, and $R^7$ is independently hydrogen, or a $C_1$-$C_{50}$ substituted or unsubstituted hydrocarbyl, halocarbyl, silylcarbyl or germylcarbyl;

each R' is, independently, a $C_1$-$C_{100}$ substituted or unsubstituted hydrocarbyl, halocarbyl, silylcarbyl or germylcarbyl;

T is a bridging group and y is 0 or 1 indicating the absence (y=0) or presence (y=1) of T;

and each X is, independently, a leaving group, or two Xs are joined and bound to the metal atom to form a metallocycle ring, or two Xs are joined to form a chelating ligand, a diene ligand, or an alkylidene.

In some embodiments of formulae II and III, y is 1 and T is $(CR^8R^9)_x$, $SiR^8R^9$ or $GeR^8R^9$ where x is 1 or 2, $R^8$ and $R^9$ are independently selected from hydrogen or substituted or unsubstituted hydrocarbyl, halocarbyl, silylcarbyl and germylcarbyl and $R^8$ and $R^9$ may optionally be bonded together to form a ring structure.

In at least one embodiment of the present disclosure, each $R^2$, $R^3$, $R^6$, and $R^7$ is independently hydrogen, or a $C_1$-$C_{50}$ substituted or unsubstituted hydrocarbyl, halocarbyl, silylcarbyl or germylcarbyl, preferably methyl, ethyl, propyl, butyl, pentyl, hexyl, heptyl, octyl, nonyl, decyl, undecyl, and dodecyl or an isomer thereof.

In at least one embodiment of the present disclosure, each $R^2$, $R^3$, $R^4$, and $R^7$ is independently hydrogen, or a $C_1$-$C_{50}$ substituted or unsubstituted hydrocarbyl, halocarbyl, silylcarbyl or germylcarbyl, preferably methyl, ethyl, propyl, butyl, pentyl, hexyl, heptyl, octyl, nonyl, decyl, undecyl, and dodecyl or an isomer thereof.

In at least one embodiment of the present disclosure, each $R^a$ or $R^d$ is independently selected from methyl, ethyl, propyl, butyl, pentyl, hexyl, heptyl, octyl, nonyl, decyl, and isomers thereof, preferably methyl and ethyl, preferably methyl.

In at least one embodiment of the present disclosure, each $R^b$, $R^c$, $R^e$ or $R^f$ is independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^a$ is independently selected from methyl, ethyl, propyl, butyl, pentyl, hexyl, heptyl, octyl, nonyl, decyl, and isomers thereof, preferably methyl and ethyl, preferably methyl, and each $R^b$ and $R^c$ are independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^d$ is independently selected from hydrogen, methyl, ethyl, propyl, butyl, pentyl, hexyl, heptyl, octyl, nonyl, decyl, and isomers thereof, preferably methyl and ethyl, preferably methyl, and each $R^e$ and $R^f$ are independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^a$, $R^b$ and $R^c$ are independently selected from hydrogen, methyl, ethyl, propyl, butyl, pentyl, hexyl, heptyl, octyl, nonyl, decyl, and isomers thereof, preferably hydrogen or methyl.

In at least one embodiment of the present disclosure, each $R^d$, $R^e$ and $R^f$ are independently selected from hydrogen, methyl, ethyl, propyl, butyl, pentyl, hexyl, heptyl, octyl, nonyl, decyl, and isomers thereof, preferably hydrogen or methyl.

In at least one embodiment of the present disclosure, R' is a $C_1$-$C_{100}$ substituted or unsubstituted hydrocarbyl, halocarbyl, or silylcarbyl, preferably methyl, ethyl, propyl, butyl, pentyl, hexyl, heptyl, octyl, nonyl, decyl, undecyl, dodecyl, phenyl or an isomer thereof, preferably t-butyl, neopentyl, cyclohexyl, cyclooctyl, cyclododecyl, adamantyl, or norbornyl.

In at least one embodiment of the present disclosure, T is $CR^8R^9$, $R^8R^9C$—$CR^8R^9$, $SiR^8R^9$ or $GeR^8R^9$ where $R^8$ and $R^9$ are independently selected from hydrogen or substituted or unsubstituted hydrocarbyl, halocarbyl, silylcarbyl and $R^8$ and $R^9$ may optionally be bonded together to form a ring structure, preferably each $R^8$ and $R^9$ is independently methyl, ethyl, propyl, butyl, pentyl, hexyl, heptyl, octyl, nonyl, decyl, benzyl, phenyl, methylphenyl or an isomer thereof, preferably methyl, ethyl, propyl, butyl, or hexyl. When $R^8$ and $R^9$ are optionally bonded together preferred bridges include substituted or unsubstituted phen-1,2-diyl, cyclohex-1,2-diyl, cyclopentamethylenesilylene, cyclotetramethylenesilylene, cyclotrimethylenesilylene and dibenzo[b,d]silolyl. Additionally, optionally any one or more adjacent $R^8$ and/or $R^9$ may join to form a substituted or unsubstituted, saturated, partially unsaturated or aromatic, cyclic or polycyclic substituent along with R'.

In at least one embodiment of the present disclosure, at least one of $R^8$ or $R^9$ is not aryl. In at least one embodiment of the present disclosure, $R^8$ is not aryl. In at least one embodiment of the present disclosure, $R^9$ is not aryl. In at least one embodiment of the present disclosure, $R^8$ and $R^9$ are not aryl.

In at least one embodiment of the present disclosure, $R^8$ and $R^9$ are independently $C_1$-$C_{10}$ alkyl, such as methyl, ethyl, propyl, butyl, pentyl, hexyl, heptyl, octyl, nonyl, decyl, or an isomer thereof.

In at least one embodiment of the present disclosure, each $R^2$, $R^3$, $R^4$, and $R^7$ is independently hydrogen or hydrocarbyl. Each $R^2$, $R^3$, $R^4$, and $R^7$ can be independently hydrogen or a $C_1$-$C_{10}$ alkyl, such as methyl, ethyl, propyl, butyl, pentyl, hexyl, heptyl, octyl, nonyl, decyl, or an isomer thereof.

In at least one embodiment of the present disclosure, each $R^2$, $R^3$, $R^6$, and $R^7$ is independently hydrogen or hydrocarbyl. Each $R^2$, $R^3$, $R^6$, and $R^7$ can be independently hydrogen or a $C_1$-$C_{10}$ alkyl, preferably methyl, ethyl, propyl, butyl, pentyl, hexyl, heptyl, octyl, nonyl, decyl, or an isomer thereof.

In at least one embodiment of the present disclosure, $R^2$ is a $C_1$-$C_{10}$ alkyl and $R^3$, $R^4$, and $R^7$ are hydrogen.

In at least one embodiment of the present disclosure, $R^2$ is a $C_1$-$C_{10}$ alkyl and $R^3$, $R^6$, and $R^7$ are hydrogen.

In at least one embodiment of the present disclosure, $R^2$, $R^3$, $R^4$, and $R^7$ are hydrogen. In at least one embodiment of the present disclosure, $R^2$, $R^3$, $R^6$, and $R^7$ are hydrogen.

In at least one embodiment of the present disclosure, $R^2$ is methyl, ethyl, or an isomer of propyl, butyl, pentyl or hexyl, and $R^3$, $R^4$, and $R^7$ are hydrogen. In at least one embodiment of the present disclosure, $R^2$ is methyl, ethyl, or an isomer of propyl, butyl, pentyl or hexyl, and $R^3$, $R^6$, and $R^7$ are hydrogen.

In at least one embodiment of the present disclosure, $R^2$ is methyl and $R^3$, $R^4$, and $R^7$ are hydrogen. In at least one embodiment of the present disclosure, $R^2$ is methyl and $R^3$, $R^6$, and $R^7$ are hydrogen.

In at least one embodiment of the present disclosure, $R^3$ is hydrogen. In at least one embodiment of the present disclosure, $R^2$ is hydrogen.

In at least one embodiment of the present disclosure, $R^2$ and each $R^a$ is independently a $C_1$-$C_{10}$ alkyl and $R^3$, $R^4$, $R^7$ and each $R^b$ and $R^c$ are hydrogen.

In at least one embodiment of the present disclosure, $R^2$ and each $R^d$ is a $C_1$-$C_{10}$ alkyl and $R^3$, $R^6$, $R^7$ and each $R^e$ and $R^f$ are hydrogen.

In at least one embodiment of the present disclosure, $R^2$ and each $R^a$ is independently a methyl, ethyl, propyl, butyl, pentyl, hexyl, heptyl, octyl, nonyl, decyl, or an isomer thereof, and $R^3$, $R^4$, $R^7$ and each $R^b$ and $R^c$ are hydrogen.

In at least one embodiment of the present disclosure, $R^2$ and each $R^d$ is a methyl, ethyl, propyl, butyl, pentyl, hexyl, heptyl, octyl, nonyl, decyl, or an isomer thereof, and $R^3$, $R^6$, $R^7$ and each $R^e$ and $R^f$ are hydrogen.

In at least one embodiment of the present disclosure, R' is $C_1$-$C_{100}$ or $C_1$-$C_{30}$ substituted or unsubstituted hydrocarbyl.

In at least one embodiment of the present disclosure, R' is $C_1$-$C_{30}$ substituted or unsubstituted alkyl (linear, branched, or cyclic), aryl, alkaryl, or heterocyclic group. In at least one embodiment of the present disclosure, R' is $C_1$-$C_{30}$ linear, branched or cyclic alkyl group.

In at least one embodiment of the present disclosure, R' is methyl, ethyl, or any isomer of propyl, butyl, pentyl, hexyl, heptyl, octyl, nonyl, decyl, undecyl, or dodecyl. In at least one embodiment of the present disclosure, R' is a cyclic or polycyclic hydrocarbyl.

In at least one embodiment of the present disclosure, R' is selected from tert-butyl, neopentyl, cyclohexyl, cycloheptyl, cyclooctyl, cyclononyl, cyclodecyl, cycloundecyl, cyclododecyl, adamantyl, and norbornyl. In at least one embodiment, R' is tert-butyl.

In at least one embodiment of the present disclosure, R' is selected from tert-butyl, neopentyl, cyclohexyl, cycloheptyl, cyclooctyl, cyclononyl, cyclodecyl, cycloundecyl, cyclododecyl, adamantyl, and norbornyl. In at least one embodiment, R' is tert-butyl.

In at least one embodiment of the present disclosure, T is selected from diphenylmethylene, dimethylmethylene, 1,2-ethylene, phen-1,2-diyl, cyclohex-1,2-diyl cyclotrimethylenesilylene, cyclotetramethylenesilylene, cyclopentamethylenesilylene, dibenzo[b,d]silolyl, dimethylsilylene, diethylsilylene, methylethylsilylene, and dipropylsilylene.

In at least one embodiment of the present disclosure, each $R^a$ is independently methyl, ethyl, propyl, butyl, pentyl or hexyl. In at least one embodiment of the present disclosure, each $R^a$ is independently methyl or ethyl. Each $R^a$ can be methyl.

In at least one embodiment of the present disclosure, each $R^d$ is independently methyl, ethyl, propyl, butyl, pentyl or hexyl. In at least one embodiment of the present disclosure, each $R^d$ is independently methyl or ethyl. Each $R^d$ can be methyl.

In at least one embodiment of the present disclosure, each $R^d$ and each $R^e$ and $R^f$ are independently hydrogen, methyl, ethyl, propyl, butyl, pentyl or hexyl. In at least one embodiment of the present disclosure, each $R^d$ is independently hydrogen, methyl, or ethyl.

In at least one embodiment of the present disclosure, each $R^b$ and $R^c$ is hydrogen. In at least one embodiment of the present disclosure, each $R^e$ and $R^f$ is hydrogen.

In at least one embodiment of the present disclosure, each X is hydrocarbyl, halocarbyl, or substituted hydrocarbyl or halocarbyl.

In at least one embodiment of the present disclosure, X is methyl, benzyl, or halo where halo includes fluoro, chloro, bromo and iodido.

In at least one embodiment of the present disclose, both X are joined together to form a $C_4$-$C_{20}$ diene ligand such as 1,3-butadiene, 1,3-pentadiene, 2-methyl-1,3-pentadiene, 2,4-dimethylpentadiene and the like.

In at least one embodiment of formula (II) of the present disclosure: 1) $R^3$ and/or $R^4$ are not aryl or substituted aryl, 2) $R^3$ is not directly bonded to a group 15 or 16 heteroatom, and 3) adjacent $R^4$, $R^c$, $R^a$, $R^b$, or $R^7$ do not join together to form a fused ring system, and 4) each $R^a$ is a $C_1$ to $C_{10}$ alkyl (preferably methyl, ethyl, propyl, butyl, pentyl, hexyl, heptyl, octyl, nonyl, decyl, or an isomer thereof).

In a preferred embodiment of the present disclosure, T of any of formulas (I)-(III) is represented by the formula $ER^g_2$ or $(ER^g_2)_2$, where E is C, Si, or Ge, and each $R^g$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^g$ can form a cyclic structure including aromatic, partially saturated, or saturated cyclic or fused ring system. Preferably, T is a bridging group comprising carbon or silica, such as dialkylsilyl, preferably T is selected from —$CH_2$—, —$CH_2CH_2$—, —$C(CH_3)_2$—, $Si(Me)_2$, cyclotrimethylenesilylene (—$Si(CH_2)_3$—), cyclopentamethylenesilylene (—$Si(CH_2)_5$—) and cyclotetramethylenesilylene (—$Si(CH_2)_4$—).

In at least one embodiment, a catalyst compound is one or more of:

dimethylsilylene(2,6,6-trimethyl-1,5,6,7-tetrahydro-s-indacen-1-yl)(t-butylamido)M(R)$_2$;
dimethylsilylene(6,6-dimethyl-1,5,6,7-tetrahydro-s-indacen-1-yl)(t-butylamido)M(R)$_2$;
dimethylsilylene(2,7,7-trimethyl-3,6,7,8-tetrahydro-as-indacen-3-yl)(t-butylamido)M(R)$_2$;
dimethylsilylene(7,7-dimethyl-3,6,7,8-tetrahydro-as-indacen-3-yl)(t-butylamido)M(R)$_2$;
dimethylsilylene(2,6,6-trimethyl-1,5,6,7-tetrahydro-s-indacen-1-yl)(cyclododecylamido)M(R)$_2$;
dimethylsilylene(6,6-dimethyl-1,5,6,7-tetrahydro-s-indacen-1-yl)(cyclododecylamido)M(R)$_2$;
dimethylsilylene(2,7,7-trimethyl-3,6,7,8-tetrahydro-as-indacen-3-yl)(cyclododecylamido)M(R)$_2$;
dimethylsilylene(7,7-dimethyl-3,6,7,8-tetrahydro-as-indacen-3-yl)(cyclododecylamido)M(R)$_2$;
dimethylsilylene(2,6,6-trimethyl-1,5,6,7-tetrahydro-s-indacen-1-yl)(cyclohexylamido)M(R)$_2$;
dimethylsilylene(6,6-dimethyl-1,5,6,7-tetrahydro-s-indacen-1-yl)(cyclohexylamido)M(R)$_2$;
dimethylsilylene(2,7,7-trimethyl-3,6,7,8-tetrahydro-as-indacen-3-yl)(cyclohexylamido)M(R)$_2$;
dimethylsilylene(7,7-dimethyl-3,6,7,8-tetrahydro-as-indacen-3-yl)(cyclohexylamido)M(R)$_2$;
dimethylsilylene(2,6,6-trimethyl-1,5,6,7-tetrahydro-s-indacen-1-yl)(adamantylamido)M(R)$_2$;
dimethylsilylene(6,6-dimethyl-1,5,6,7-tetrahydro-s-indacen-1-yl)(adamantylamido)M(R)$_2$;
dimethylsilylene(2,7,7-trimethyl-3,6,7,8-tetrahydro-as-indacen-3-yl)(adamantylamido)M(R)$_2$;
dimethylsilylene(7,7-dimethyl-3,6,7,8-tetrahydro-as-indacen-3-yl)(adamantylamido)M(R)$_2$;
dimethylsilylene(2,6,6-trimethyl-1,5,6,7-tetrahydro-s-indacen-1-yl)(neopentylamido)M(R)$_2$;
dimethylsilylene(6,6-dimethyl-1,5,6,7-tetrahydro-s-indacen-1-yl)(neopentylamido)M(R)$_2$;

dimethylsilylene(2,7,7-trimethyl-3,6,7,8-tetrahydro-as-indacen-3-yl)(neopentylamido)M(R)$_2$;
dimethylsilylene(7,7-dimethyl-3,6,7,8-tetrahydro-as-indacen-3-yl)(neopentylamido)M(R)$_2$;
dimethylsilylene(2-methyl-6,6-diethyl-1,5,6,7-tetrahydro-s-indacen-1-yl)(t-butylamido)M(R)$_2$;
dimethylsilylene(6,6-diethyl-1,5,6,7-tetrahydro-s-indacen-1-yl)(t-butylamido)M(R)$_2$;
dimethylsilylene(2-methyl-7,7-diethyl-3,6,7,8-tetrahydro-as-indacen-3-yl)(t-butylamido)M(R)$_2$;
dimethylsilylene(7,7-diethyl-3,6,7,8-tetrahydro-as-indacen-3-yl)(t-butylamido)M(R)$_2$;
dimethylsilylene(2-methyl-6,6-diethyl-1,5,6,7-tetrahydro-s-indacen-1-yl)(cyclododecylamido)M(R)$_2$;
dimethylsilylene(6,6-diethyl-1,5,6,7-tetrahydro-s-indacen-1-yl)(cyclododecylamido)M(R)$_2$;
dimethylsilylene(2-methyl-7,7-diethyl-3,6,7,8-tetrahydro-as-indacen-3-yl)(cyclododecylamido)M(R)$_2$;
dimethylsilylene(7,7-dimethyl-3,6,7,8-tetrahydro-as-indacen-3-yl)(cyclododecylamido)M(R)$_2$;
diethylsilylene(2,6,6-trimethyl-1,5,6,7-tetrahydro-s-indacen-1-yl)(t-butylamido)M(R)$_2$;
diethylsilylene(6,6-dimethyl-1,5,6,7-tetrahydro-s-indacen-1-yl)(t-butylamido)M(R)$_2$;
diethylsilylene(2,7,7-trimethyl-3,6,7,8-tetrahydro-as-indacen-3-yl)(t-butylamido)M(R)$_2$;
diethylsilylene(7,7-dimethyl-3,6,7,8-tetrahydro-as-indacen-3-yl)(t-butylamido)M(R)$_2$;
dimethylsilylene(2-methyl-3,6,7,8-tetrahydro-as-indacen-3-yl)(cyclohexylamido)M(R)$_2$;
dimethylsilylene(2-methyl-3,6,7,8-tetrahydro-as-indacen-3-yl)(cyclododecylamido)M(R)$_2$;
dimethylsilylene(2-methyl-3,6,7,8-tetrahydro-as-indacen-3-yl)(adamantylamido)M(R)$_2$; and
dimethylsilylene(2-methyl-3,6,7,8-tetrahydro-as-indacen-3-yl)(t-butylamido)M(R)$_2$,
where M is selected from Ti, Zr, and Hf and R is selected from halogen or $C_1$ to $C_5$ alkyl, preferably R is a methyl group or a halogen group, preferably M is Ti.

In alternative embodiments, a catalyst system can include two or more different transition metal compounds. For purposes of the present disclosure one transition metal compound is considered different from another if they differ by at least one atom. For example "Me$_2$Si(2,7,7-Me$_3$-3,6,7,8-tetrahydro-as-indacen-3-yl)(cyclohexylamido)TiCl$_2$" is different from Me$_2$Si(2,7,7-Me$_3$-3,6,7,8-tetrahydro-as-indacen-3-yl)(n-butylamido)TiCl$_2$" which is different from Me$_2$Si(2,7,7-Me$_3$-3,6,7,8-tetrahydro-as-indacen-3-yl)(n-butylamido)HfCl$_2$.

In some embodiments, formulae I through III are referred to as mono-tetrahydroindacenyl compounds, precatalysts and/or catalysts.

In at least one embodiment, one mono-tetrahydroindacenyl compound as described herein is used in the catalyst system.

Activators

The terms "cocatalyst" and "activator" are used herein interchangeably and include a compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include non-coordinating anion compounds, alumoxane compounds, modified alumoxane compounds, and ionizing anion precursor compounds that abstract a reactive, s-bound, metal ligand making the metal complex cationic and providing a charge-balancing noncoordinating or weakly coordinating anion.

Alumoxane Activators

Alumoxane activators are utilized as activators in the catalyst systems described herein. Alumoxanes are generally oligomeric compounds containing —Al(R$^1$)—O— subunits, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

Non Coordinating Anion Activators

Non-coordinating anion activators may also be used herein. The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri (n-butyl) ammonium tetrakis(pentafluorophenyl) borate, N,N-dimethylaniliniumtetrakis(pentafluorophenyl)borate, N-dimethylanilinium tetrakis(perfluoronaphthyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), alone or in combination with the alumoxane or modified alumoxane activators. It is also within the scope of the present disclosure to use neutral or ionic activators in combination with the alumoxane or modified alumoxane activators.

The catalyst systems of the present disclosure can include at least one non-coordinating anion (NCA) activator. Specifically the catalyst systems may include NCAs which either do not coordinate to a cation or which only weakly coordinate to a cation thereby remaining sufficiently labile to be displaced during polymerization.

In a preferred embodiment boron containing NCA activators represented by the formula below can be used:

$$Z_d^+(A^{d-})$$

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_{d+}$ is triphenyl carbonium. Preferred reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids as "Z" include those represented by the formula: $(Ph_3C)$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation $(L-H)_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst are the compounds described as (and particularly those specifically listed as) activators in U.S. Pat. No. 8,658,556, which is incorporated by reference herein.

Most preferably, the ionic activator $Z_d^+$ $(A^{d-})$ is one or more of N,N-methylanilinium tetrakis(pentafluorophenyl) borate, N,N-dimethylanilinium tetrakis(perfluoronaphthyl) borate, N,N-dimethylanilinium tetrakis(perfluorobiphenyl) borate, N,N-dimethylanilinium tetrakis(3,5-bis (trifluoromethyl)phenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

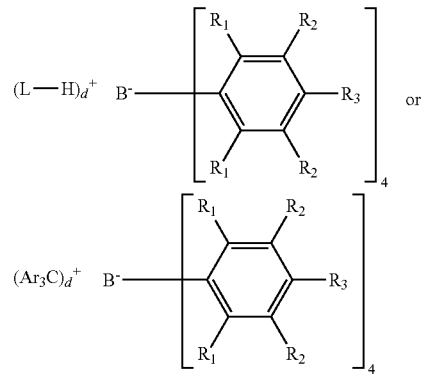

where: each $R_1$ is, independently, a halide, preferably a fluoride; Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics; each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and L is an neutral Lewis base; $(L-H)^+$ is a Bronsted acid; d is 1, 2, or 3; wherein the anion has a molecular weight of greater than 1020 g/mol; wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids,"

Journal of Chemical Education, Vol. 71, No. 11, November 1994, pp. 962-964. Molecular volume (MV), in units of cubic Å, is calculated using the formula: MV=8.3$V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, Me$_3$NH$^+$][B(C$_6$F$_5$)$_4^-$]; 1-(4-(tris(pentafluorophenyl)borate)-2,3,5,6-tetrafluorophenyl)pyrrolidinium; and tetrakis(pentafluorophenyeborate, and 4-(tris(pentafluorophenyl)borate)-2,3,5,6-tetrafluoropyridine.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium)tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium)tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

In preferred embodiments of the invention, N,N-dimethylanilinium tetrakis(perfluoronaphthyl)borate is the preferred activator.

The typical NCA activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Activators useful herein also include those described in U.S. Pat. No. 7,247,687 at column 169, line 50 to column 174, line 43, particularly column 172, line 24 to column 173, line 53.

It is also within the scope of the present disclosure that the catalyst compounds can be combined with combinations of alumoxanes and NCA's (see for example, U.S. Pat. Nos. 5,153,157, 5,453,410, EP 0 573 120 B1, WO 94/07928, and WO 95/14044 which discuss the use of an alumoxane in combination with an ionizing activator).

Optional Scavengers or Co-Activators

In addition to the activator compounds, scavengers, chain transfer agents or co-activators may be used. Aluminum alkyl or organoaluminum compounds which may be utilized as scavengers or co-activators include, for example, triethylaluminum, triethylaluminum, triisobutylaluminum, tri-n-hexylaluminum, tri-n-octylaluminum, and diethyl zinc.

Useful chain transfer agents that may also be used herein are typically a compound represented by the formula AlR$_3$, ZnR$_2$ (where each R is, independently, a C$_1$-C$_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

In some embodiments, the catalyst compounds described herein may be supported (with or without an activator) by any method effective to support other coordination catalyst systems, effective meaning that the catalyst so prepared can be used for oligomerizing or polymerizing olefin in a heterogeneous process. The catalyst precursor, activator, co-activator if needed, suitable solvent, and support may be added in any order or simultaneously. Typically, the complex and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and over 10-16 hours. But greater or lesser times and temperatures are possible.

The complex may also be supported absent the activator; in that case, the activator (and co-activator if needed) is added to a polymerization process's liquid phase. Additionally, two or more different complexes may be supported on the same support. Likewise, two or more activators or an activator and co-activator may be supported on the same support.

Suitable solid particle supports are typically comprised of polymeric or refractory oxide materials, each being preferably porous. A support material can have an average particle size greater than 10 µm for use in embodiments of the present disclosure. VA support material can be a porous support material, such as, talc, inorganic oxides, inorganic chlorides, for example magnesium chloride and resinous support materials such as polystyrene polyolefin or polymeric compounds or any other organic support material and the like. A support material can be an inorganic oxide material including group-2, -3, -4, -5, -13, or -14 metal or metalloid oxides. A catalyst support materials can be silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as the activator component, however, an additional activator may also be used.

The support material may be pretreated by any number of methods. For example, inorganic oxides may be calcined, chemically treated with dehydroxylating agents such as aluminum alkyls and the like, or both.

As stated above, polymeric carriers will also be suitable in accordance with the present disclosure, see for example the descriptions in WO 95/15815 and U.S. Pat. No. 5,427, 991. The methods disclosed may be used with the catalyst complexes, activators or catalyst systems of the present disclosure to adsorb or absorb them on the polymeric supports, particularly if made up of porous particles, or may be chemically bound through functional groups bound to or in the polymer chains.

Useful supports typically have a surface area of from 10-700 $m^2/g$, a pore volume of 0.1-4.0 cc/g and an average particle size of 10-500 µm. Some embodiments select a surface area of 50-500 $m^2/g$, a pore volume of 0.5-3.5 cc/g, or an average particle size of 20-200 µm. Other embodiments select a surface area of 100-400 $m^2/g$, a pore volume of 0.8-3.0 cc/g, and an average particle size of 30-100 µm. Useful supports typically have a pore size of 10-1000 Angstroms, alternatively 50-500 Angstroms, or 75-350 Angstroms.

The catalyst complexes described herein are generally deposited on the support at a loading level of 10-100 micromoles of complex per gram of solid support; alternately 20-80 micromoles of complex per gram of solid support; or 40-60 micromoles of complex per gram of support. But greater or lesser values may be used provided that the total amount of solid complex does not exceed the support's pore volume.

In an alternative embodiment, catalyst complexes and catalyst systems described herein may be present on a fluorided support, e.g. a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. For example, a useful support herein, is a silica support treated with ammonium hexafluorosilicate and/or ammonium tetrafluoroborate fluorine compounds. Typically the fluorine concentration present on the support is in the range of from 0.1 to 25 wt %, alternately 0.19 to 19 wt %, alternately from 0.6 to 3.5 wt %, based upon the weight of the support.

In an embodiment of the present disclosure, the catalyst system comprises fluorided silica, alkylalumoxane activator, and the bridged monocyclopentadienyl group 4 transition metal compound, where the fluorided support has not been calcined at a temperature of 400° C. or more.

The catalyst compound may be present on a support at 1 to 100 µmol/g supported catalyst, preferably 20-60 µmol/g supported catalyst.

The present disclosure also relates to metallocene catalyst systems comprising the reaction product of at least three components: (1) one or more bridged metallocenes having one tetrahydroindacenyl group; (2) one or more alkylalumoxane or NCA activator; and (3) one or more fluorided support compositions, where the fluorided support composition has not been calcined at 400° C. or more, preferably the fluorided support composition has been calcined at a temperature of 100° C. to 395° C., alternately 125° C. to 350° C., alternately 150° C. to 300° C.).

Typically, the fluorided supports described herein are prepared by combining a solution of polar solvent (such as water) and fluorinating agent (such as $SiF_4$ or $(NH_4)_2SiF_6$) with a slurry of support (such as a toluene slurry of silica), then drying until it is free flowing, and optionally, calcining (typically at temperatures over 100° C. for at least 1 hour). The supports are then combined with activator(s) and catalyst compound (separately or together).

For more information on fluorided supports and methods to prepare them, please see U.S. Ser. No. 62/149,799, filed Apr. 20, 2015 (and all cases claiming priority to or the benefit of U.S. Ser. No. 62/149,799); U.S. Ser. No. 62/103, 372, filed Jan. 14, 2015 (and all cases claiming priority to or the benefit of U.S. Ser. No. 62/103,372); and PCT/US2015/067582, filed Dec. 28, 2015 which are incorporated by reference herein.

Ethylene-Based Copolymer

Compositions of the present disclosure comprise an ethylene-based copolymer. In at least one embodiment, a composition comprises a blend of one or more PEDM terpolymers and one or more ethylene-based copolymers.

Compositions of the present disclosure may comprise one or more ethylene-based copolymers in an amount from about 0 phr to about 99 phr, or from about 20 phr to about 99 phr, or from about 40 phr to about 99 phr, or from about 60 phr to about 99 phr, or from about 60 phr to about 95 phr, or from about 70 phr to about 95 phr, or from about 70 phr to about 10 phr, where the basis of 100 parts rubber is taken as the combined weight of PEDM and the ethylene-based copolymer in the composition.

The ethylene-based copolymer may have an ethylene content from 40 wt % to 95 wt %, or 50 wt % to 90 wt %, or 55 wt % to 85 wt %, or 60 wt % to 75 wt %, based on the weight of the ethylene-based copolymer.

Ethylene-based copolymers of the present disclosure further comprise a $C_3$ to $C_{12}$ α-olefin content and, optionally, a polyene (preferably diene) content.

The ethylene-based copolymer may have an propylene content from 5 wt % to 60 wt %, or 10 wt % to 50 wt %, or 25 wt % to 50 wt %, or 5 wt % to 30 wt %, based on the weight of the ethylene-based copolymer. $C_3$ to $C_{12}$ α-olefins include propylene, butylene, pentylene, hexylene, heptylene, octylene, nonylene, decylene, undecylene, dodecylene, and branched isomers thereof. Propylene is particularly preferred according to some embodiments (e.g., such that the ethylene-based copolymer may be an EP(D)M copolymer), while butylene (1-butene) is preferred in yet other embodiments (e.g., such that the ethylene-based copolymer may be an EB(D)M copolymer). Further, in certain embodiments, ethylene-based copolymers of the present disclosure can have isotactic polypropylene content.

The ethylene-based copolymer may have a polyene content (preferably a diene content) from 0 wt % to 10 wt %, or 0.5 wt % to 5 wt %, or 5 wt % to 10 wt %, or 3 wt % to 7 wt %, based on the weight of the ethylene-based copolymer. Any polyene suitable in the PEDM is suitable for inclusion in the ethylene-based copolymer, with VNB or ENB, and in particular ENB, preferred. According to yet other embodiments, suitable polyenes may include conjugated dienes. Conjugated dienes include 1,3-butadiene, 2-methyl-1,3-butadiene, 2,3-di($C_1$ to $C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. Dienes also include vinylaromatic compounds: styrene, ortho-, meta- or para-methylstyrene, the "vinyltoluene" commercial mixture, para-(tert-butyestyrene, methoxystyrenes, chlorostyrenes, vinylmesitylene, divinylbenzene or vinylnaphthalene.

According to some embodiments, the ethylene-based copolymer exhibits more crystallinity than the PEDM; for instance, it may have Hf>1 J/g. According to yet further embodiments, crystallinity of ethylene-based copolymers of the present disclosure may be expressed in terms of percentage of crystallinity (i.e., % crystallinity), as determined according to the DSC procedure described herein. An ethylene-based copolymer may have a % crystallinity of from 1% to 80%, such as from 10% to 60%, such as from 20% to 40%. (The degree of crystallinity is determined by dividing heat of fusion measured with the heat of fusion for 100% crystalline polyethylene which has the value of 293 J/g (B. Wunderlich, Thermal Analysis, Academic Press, 1990, pp. 417-431).)

An ethylene-based copolymer may be an ethylene-propylene copolymer and in particular an EP(D)M terpolymer (e.g., VISTALON™ 706, VISTALON™ 2504, and VISTALON™ 7500, available from ExxonMobil; TAFMER™, available from Mitsui Chemicals; or VERSIFY™, available from Dow Chemical) or an EB(D)M terpolymer. Ethylene-based copolymers of the present disclosure can have a weight average molecular weight (Mw) from 10,000 g/mol to 400,000 g/mol, or 100,000 g/mol to 200,000. They may also or instead have a melting point (DSC) of less than 110° C., or less than 100° C.

Compositions described herein can comprise a single ethylene-based copolymer or a mixture of two or more ethylene-based copolymers, it being possible for the ethylene-based copolymers to be used in combination with any type of synthetic elastomer other than an ethylene-based copolymer, indeed even with polymers other than elastomers, for example thermoplastic polymers.

In at least one embodiment, the ethylene-based copolymer is a polyethylene-polybutadiene block-copolymer, wherein the polyethylene-polybutadiene block-copolymer is a block copolymer having the general formula: PE-XL-fPB; where "PE" is a polyethylene block having a weight average molecular weight within the range from 1,000 to 150,000 g/mol, the "fPB" is a functionalized polar polybutadiene block having a weight average molecular weight from 500 g/mol to 30,000 g/mol, and "XL" is a crosslinking moiety that covalently links the PE and fPB blocks; and wherein the Maximum Energy Loss (Tangent Delta) of the immiscible polyolefin domain is a temperature within the range from −30° C. to 10° C.

In at least one embodiment, compositions of the present disclosure comprise 15 wt % to 60 wt % of a styrenic copolymer; 1 wt % to 60 wt % of a polybutadiene polymer; 1 wt % to 60 wt % of natural rubber or synthetic polyisoprene; 15 wt % to 60 wt % of a functionalized styrenic copolymer; 1 wt % to 60 wt % of a functionalized polar polybutadiene polymer; or 1 wt % to 60 wt % of natural rubber or functionalized synthetic polyisoprene.

Polymer Blending

Compositions of the present disclosure may be formed by combining the PEDM and the ethylene-based copolymer using any suitable method known in the polymer processing art. For example, a composition may be made by blending the PEDM and the ethylene-based copolymer in solution and generally removing the blend. This polymer composition has predetermined amounts of the PEDM and the ethylene-based copolymer and may be made by independent polymerization of the first and second elastomeric polymeric components. Such individual polymerization may be conducted in series or parallel polymerization reactors or in a single polymerization reactor with at least two different polymerization catalysts. Procedures for the recovery of such a predetermined composition are described in U.S. Pat. No. 4,722,971, which are incorporated herein by reference. The disclosure includes traditional Ziegler-Natta catalyst systems, however metallocene catalyst systems are also contemplated for the present disclosure.

In at least one embodiment, a method for preparing a composition of the PEDM and the ethylene-based copolymer includes contacting in a first reactor a first metallocene catalyst with ethylene, propylene, and a diene to form a PEDM. The method further includes contacting in a second reactor (or the first reactor) a second metallocene catalyst with ethylene and propylene, and optionally a diene, to form an ethylene-based copolymer. Methods can include transferring the PEDM to the second reactor or the ethylene-based copolymer to the first reactor and recovering from the second reactor or the first reactor, respectively, a mixture of the PEDM and the ethylene-based copolymer. The recovered polymer composition may then be crosslinked, for example, as described in more detail below.

Alternatively, in at least one embodiment, a blend of the PEDM and the ethylene-based copolymer may be prepared by combining the PEDM from the first reactor and the ethylene-based copolymer from the second reactor and mixed, for example, in a production extruder, such as the extruder on an injection molding machine or on a continuous extrusion line.

In at least one embodiment, the method of blending the polymers may be to melt-blend the polymers in a batch mixer, such as a BANBURY™ or BARBENDER™ mixer. Blending may include melt blending the PEDM and the ethylene-based copolymer in an extruder, such as a single-screw extruder or a twin-screw extruder. Extrusion technology for polymer blends is well known in the art, and is described in more detail in, for example, *PLASTICS EXTRUSION TECHNOLOGY*, F. Hensen, Ed. (Hanser, 1988), pp. 26-37, and in *POLYPROPYLENE HANDBOOK*, E. P. Moore, Jr. Ed. (Hanser, 1996), pp. 304-348.

The PEDM and the ethylene-based copolymer may also be blended by a combination of methods including, but not limited to, solution blending, melt mixing, compounding in a shear mixer and combinations thereof. For example, dry blending followed by melt blending in an extruder, or batch mixing of some components followed by melt blending with other components in an extruder. The PEDM and the ethylene-based copolymer may also be blended using a double-cone blender, ribbon blender, or other suitable blender, or in a Farrel Continuous Mixer (FCM™).

The PEDM, the ethylene-based copolymer, and additives (e.g., curatives, crosslinking agents, fillers, process oils, plasticizers, compatibilizers, crosslinkers, and the like) may be blended in varying orders, which in some instances may alter the properties of the resultant composition.

In some instances, a master batch that comprises the PEDM, the ethylene-based copolymer, and additives (except curatives and crosslinking agents) may be produced at a first temperature. Then, the curatives and/or crosslinking agents may be mixed into the master batch at a second temperature that is lower than the first temperature.

In some embodiments, the master batch may be produced by mixing together in one step the PEDM, the ethylene-based copolymer, and the additives (except curatives and crosslinking agents) until the additives are incorporated (e.g., producing a homogeneous blend). This is referred to herein as a first pass method or first pass blending. After the first pass blending produces the master batch, the curatives and/or crosslinking agents may be mixed into the master batch to produce the final blend.

In alternative embodiments, a two step mixing process may be used to produce the master batch. For example, in some embodiments, the master batch may be produced by mixing the ethylene-based copolymer with the additives (except curatives and crosslinking agents) until the additives are incorporated into the ethylene-based copolymer (e.g., producing a homogeneous blend). Then, the resultant blend is mixed with the PEDM and the curatives and/or crosslinking agents. This is referred to herein as a second pass method or a second pass blending. Alternatively, the curatives and/or crosslinking agents may be mixed into the master batch after addition of the PEDM in the second pass to produce the final blend.

In some second pass blending embodiments, mixing the ethylene-based copolymer/additive (except curatives and crosslinking agents) blend with the PEDM may be done in mixer or other suitable system without removing the ethylene-based copolymer/additive blend from the mixer (i.e., first pass blending) to produce the master batch. In alternative embodiments, the ethylene-based copolymer/additive (except curatives and crosslinking agents) blend may be removed from a mixer or other suitable system for producing the blend, and, then, mixed with the PEDM in a mixer or other suitable system (i.e., second pass blending) to produce the master batch.

The homogeneous mixture may be achieved by mixing for a certain time that corresponds to producing a homogeneous mixture. In some instances, a mixing parameter of the ethylene-based copolymer and the chosen additives may change when a homogeneous mixture is achieved. For example, when mixing carbon black (an exemplary filler) with the ethylene-based copolymer, the torque may reach a maximum, steady-state where no to minimal appreciable increases in torque are observed.

Compositions

Compositions of the present disclosure include and/or are the reaction product of the PEDM and the ethylene-based copolymer (as a polymer blend or otherwise) described above (and in whatever form: pellet, bale, or otherwise). As described above, compositions of the present disclosure may further include and/or be the reaction product of any one or more additives (e.g., curatives, crosslinking agents, fillers, process oils, plasticizers, compatibilizers, crosslinkers, and the like).

In embodiments where curatives, e.g., crosslinking agents or vulcanizing agents, are present in a composition, the polymers of the composition may be present in at least partially crosslinked form (that is, at least a portion of the polymer chains are crosslinked with each other, e.g., as a result of a curing process typical for EP(D)M rubbers). Accordingly, particular embodiments provide for an at least partially crosslinked elastomeric composition made by mixing (in accordance with any of the above-described methods for polymer blends) a composition comprising: (a) a PEDM and an ethylene-based copolymer; (b) one or more vulcanization activators; (c) one or more vulcanizing agents; and/or (d) one or more further additives.

Suitable vulcanization activators include zinc oxide, stearic acid, and the like. These activators may be mixed in amounts ranging from 0.1 phr to 20 phr. Different vulcanization activators may be present in different amounts. For instance, where the vulcanization activator includes zinc oxide, the zinc oxide may be present in an amount from 1 phr to 20 phr, or from 2.5 phr to 10 phr, or about 5 phr, while stearic acid may preferably be employed in amounts ranging from 0.1 phr to 5 phr, or 0.1 phr to 2 phr, or about 1.5 phr).

Any suitable vulcanizing agent known in the art may be used. Of particular note are curing agents as described in Col. 19, line 35 to Col. 20, line 30 of U.S. Pat. No. 7,915,354, which description is hereby incorporated by reference (e.g., sulfur, peroxide-based curing agents (VUL-CUP™ 40 KE available from Arkema of Colombes, France, resin curing agents, silanes, and hydrosilane curing agents). Other examples include phenolic resin curing agents (e.g., as described in U.S. Pat. No. 5,750,625, also incorporated by reference herein). Cure co-agents may also be included (e.g., zinc dimethacrylate (ZDMA) (DYMALINK™ 708, available from Cray Valley) or those described in the already-incorporated description of U.S. Pat. No. 7,915,354).

Further additives may be chosen from any known additives useful for EPDM compositions, and include, among others, one or more of:

Process oil, such as paraffinic and/or isoparaffinic process oil (examples including SUNPAR™ 2280 (available from HollyFrontier Refining & Marketing LLC, Tulsa, Oklahoma); as well as FLEXON™ 876, CORE™ 600 base stock oil, FLEXON™ 815, and CORE™ 2500 base stock oil, available from ExxonMobil Chemical Company, Baytown, Texas. Particularly in embodiments where color of the end product may be important, a white oil (e.g., API Group II or Group III base oil) may be used as process oil. Examples include paraffinic and/or isoparaffinic oils with low (under 1 wt %, preferably under 0.1 wt %) aromatic and heteroatom content. Compositions of the present disclosure may comprise process oil from 1 phr to 150 phr, or 50 phr to 100 phr, or 60 phr to 80 phr, or, for sponge grades, from 50 phr to 200 phr, or 70 phr to 150 phr, or 80 phr to 100 phr, and preferred process oils have viscosity at 40° C. from 80 CSt to 600 CSt;

Vulcanization accelerators: compositions of the present disclosure can comprise 0.1 phr to 15 phr, or 1 phr to 5 phr, or 2 phr to 4 phr, with examples including thiazoles such as 2-mercaptobenzothiazole or mercaptobenzothiazyl disulfide (MBTS); guanidines such as diphenylguanidine; sulfenamides such as N-cyclohexylbenzothiazolsulfenamide; dithiocarbamates such as zinc dimethyl dithiocarbamate, zinc diethyl dithiocarbamate, zinc dibenzyl dithiocarbamate (ZBEC); and zinc dibutyldithiocarbamate, thioureas such as 1,3-diethylthiourea, thiophosphates and others;

Processing aids (e.g., polyethylene glycol or zinc soap);

Carbon black (e.g., having particle size from 20 nm to 600 nm and structure having DBPA (dibutyl phthalate absorption number) within the range from 0 to 150, as measured by the DBP method. Compositions of the present disclosure may comprise carbon black from 1 phr to 500 phr, preferably from 1 phr to 200 phr, or from 50 phr to 150 phr;

Mineral fillers (talc, calcium carbonate, clay, silica, aluminum trihydrate, and the like), which may be present in the composition from 1 phr to 200 phr, preferably from 20 phr to 100 phr, or from 30 phr to 60 phr;

Where foaming may be desired, sponge or foaming grade additives, such as foaming agent or blowing agent, particularly in very high Mooney viscosity embodiments, such as those suitable for sponge grades. Examples of such agents include: azodicarbonamide (ADC), ortho-benzo sulfonyl hydrazide (OBSH), p-toluenesulfonylhydrazide (TSH), 5-phenyltetrazole (5-PT), and sodium bicarbonate in citric acid. Microcapsules may also or instead be used for such foaming applications. These may include a thermo-expandable microsphere comprising a polymer shell with a propellant contained therein. Examples are known in the art and described in, for example, U.S. Pat. Nos. 6,582,633 and 3,615,972, WIPO Publication Nos. WO 99/46320 and WO 99/43758, and contents of which hereby are incorporated by reference. Examples of such thermo-expandable microspheres include EXPANCEL™ products commercially available from Akzo Nobel N.V., and ADVANCELL™ products available from Sekisui. In other embodiments, sponging or foaming may be accomplished by direct injection of gas and/or liquid (e.g., water, $CO_2$, $N_2$) into the rubber in an extruder, for foaming after passing the composition through a die; and Various other additives may also be included, such as antioxidants (e.g., 1,2-dijydro-2,2,4-trimethylquinoline), stabilizers, anticorrosion agents, UV absorbers, antistatics, slip agents, moisture absorbents (e.g., calcium oxide), pigments, dyes or other colorants.

The at least partially crosslinked polymer compositions of the present disclosure are formed by mixing the above-described components in any suitable manner described in the Polymer Blending section above, e.g. Banbury mixer. Mixing in these embodiments may include any one or more of typical mixing processes for EP(D)M compositions, such as open mill mixing, mixing using internal mixers or kneaders, and extrusion (e.g., through a twin-screw extruder).

Further, in some embodiments, additives may be incorporated into a polymer blend directly or as part of a master batch, i.e., an additive package containing several additives to be added at one time in predetermined proportions. The master batch may be added in any suitable amount. For example, a master batch comprising an additive may be used in an amount ranging from about 0.1 to about 10 wt %, or from about 0.25 to about 7.5 wt %, or from about 0.5 to about 5 wt %, or from about 1 to about 5 wt %, or from about 2 to about 4 wt %, based on the total weight of the polymer blend and the master batch. This is a common practice in polymer processing, typically used for addition of color, additives, and fillers to final compositions. Dispersion (or "letdown") of the master batch may take place as part of a processing step used to fabricate articles, such as in the extruder on an injection molding machine or on a continuous extrusion line, or during a separate compounding step.

The compositions described herein comprising the PEDM and the ethylene-based copolymer can have a green rubber-to-rubber tack force after blending of 20 g of force/inch width or greater, or 20 g of force/inch width to 6000 g of force/inch width, or 50 g of force/inch width to 5000 g of force/inch width. The compositions described herein comprising the PEDM and the ethylene-based copolymer can have a green rubber-to-rubber tack force after aging at room temperature for 1 month of 20 g of force/inch width or greater, or 20 g of force/inch width to 6000 g of force/inch width, or 50 g of force/inch width to 5000 g of force/inch width. The compositions described herein comprising the PEDM and the ethylene-based copolymer can have percent retention in a green rubber-to-rubber tack force from blending to aging at room temperature for 1 month (aged force divided by blended force times 100) of 20% to 250%, or 30% to 150%, or 30% to 100%, or 50% to 250%. A 200% retention in tack force means the tack force doubled with aging.

The compositions described herein comprising the PEDM and the ethylene-based copolymer can have a green rubber-to-polar substrate tack force after blending of 10 g of force/inch width or greater, or 10 g of force/inch width to 500 g of force/inch width, or 10 g of force/inch width to 400 g of force/inch width, or 10 g of force/inch width to 300 g of force/inch width, or 10 g of force/inch width to 200 g of force/inch width, or 20 g of force/inch width to 200 g of force/inch width. Polar substrates can comprise any suitable materials, such as one or more of cotton, rayon, polyamide, polyester, polycarbonate, aramid, steel, aluminum, glass, carbon, polyketone, basalt, boron, and oriented discontinuous fibers, which are used in fabricating rubber parts, e.g., for reinforcement.

Rubber-to-rubber and rubber-to-polar-substrate tack testing can be measured based on Modified ASTM D3330/D330M-04(2010) Method B and F. This method provides the benefit of a larger test area and longer dwell time, thus providing more extensive testing of the sample versus the Tel-Tak method.

Belts

Compositions of the present disclosure may be used as one or more components of a transmission belt (e.g., V-belt, a flat belt, a toothed or synchronous belt, or multi-ribbed belt) and/or a conveyor belt.

FIG. 1 is a fragmented perspective view of a transmission belt in accordance with some embodiments of the present disclosure. As shown in FIG. 1, synchronous belt 100 includes elastomeric main body portion 102 and sheave contact portion 104 positioned along the inner periphery of main body portion 102. Main body portion 102 comprises one or more PEDM-including compositions of the present disclosure. Sheave contact portion 104 is configured to form alternating transverse projections 106 and troughs 108 configured to couple with a transverse-grooved pulley or sprocket. Tensile layer 110 is positioned within main body portion 102 for providing support and strength to belt 100. Tensile layer 110 includes a plurality of tensile cords 112 disposed longitudinally along the length of main body portion 112. Cords 112 comprise any suitable material, such as one or more of cotton, rayon, polyamide, polyester, aramid, steel, aluminum, glass, carbon, polyketone, basalt, boron, polycarbonate, or discontinuous fibers oriented for low load carrying capability. Said cords 112 may be untreated or have a surface treatment. Said surface treatment may be a coating physically on or chemically bonded to the surface of the cords 112. As used herein, the term "coating" does not imply 100% coverage but can be any amount of coverage. The coating, physical or chemical, are used to enhance the bonding or tack between the generally polar cords and the generally nonpolar rubbers. Examples of coatings on the surface of the cords 112 can include, but are not limited to, polymers or small molecules that are dip coated, spray coated, or extruded on the surface. For example, polymers comprising amine or amide moieties may chemically bond to hydroxyl groups of rayon and polyester cords. Heat may be used to facilitate chemical reactions between cord surfaces and coatings. Optionally, a PEDM (e.g., a PEDM described herein) may be a component of the coating optionally with an ethylene-based copolymer (e.g., an ethylene-based copolymer described herein). For example, the PEDM component in the coating may be a PEDM terpolymer comprising 59 wt % to 99 wt % propylene, 1 wt % to 41 wt % α-olefin, and 0.5 wt % to 20 wt % diene, said wt % based on the weight of the PEDM terpolymer, at an amount of from 1 phr to 100 phr. The ethylene-based copolymer component in the coating may be an ethylene-based copolymer comprising 40 wt % to 95 wt % ethylene, 5 wt % to 60 wt % α-olefin, and 0 wt % to 10 wt % diene, said wt % based on the weight of the ethylene-based copolymer, at an amount of from 0 phr to 99 phr. Said PEDM terpolymer and ethylene-based copolymer in the coating does not necessarily have to be the same as the PEDM terpolymer and ethylene-based copolymer in the compositions described herein (e.g., PEDM terpolymer optionally with ethylene-based copolymer).

Reinforcing fabric 114 is disposed on projections 106 and troughs 108 and to form a sheave contact portion. Reinforcing fabric 114 may be of any suitable configuration such as a conventional weave consisting of warp and weft threads at an angle, or may include warp threads held together by space pick cords, or a knitted or braided configuration, or a nonwoven fabric. Suitable fabrics include one or more of cotton, polyester, polyamide, polycarbonate, acrylic, aramid, polyketone, hemp, jute, or fiberglass. Said fabric 114 may be untreated or have a surface treatment. Said surface treatment may be a coating physically on or chemically bonded to the surface of the fabric 114. As used herein, the term "coating" does not imply 100% coverage but can be any amount of coverage. The coating, physical or chemical, are used to enhance the bonding or tack between the generally polar fabric and the generally nonpolar rubbers. Examples of coatings on the surface of the fabric 114 can include, but are not limited to, polymers or small molecules that are calendared, extruded, dip coated, or spray coated on the surface. For example, polymers comprising amine or amide moieties may chemically bond to hydroxyl groups of polyester fabric. Heat may be used to facilitate chemical reactions or physical bonding between fabric surfaces and coatings. Optionally, a PEDM (e.g., a PEDM described herein) may be a component of the coating optionally with an ethylene-based copolymer (e.g., an ethylene-based copolymer described herein). For example, the PEDM component in the coating may be a PEDM terpolymer comprising 59 wt % to 99 wt % propylene, 1 wt % to 41 wt % α-olefin, and 0.5 wt % to 20 wt % diene, said wt % based on the weight of the PEDM terpolymer, at an amount of from 1 phr to 100 phr. The ethylene-based copolymer component in the coating may be an ethylene-based copolymer comprising 40 wt % to 95 wt % ethylene, 5 wt % to 60 wt % α-olefin, and 0 wt % to 10 wt % diene, said wt % based on the weight of the ethylene-based copolymer, at an amount of from 0 phr to 99 phr. Said PEDM terpolymer and ethylene-based copolymer in the coating does not necessarily have to be the same as the PEDM terpolymer and ethylene-based copolymer in the compositions described herein (e.g., PEDM terpolymer optionally with ethylene-based copolymer).

Figure 2:
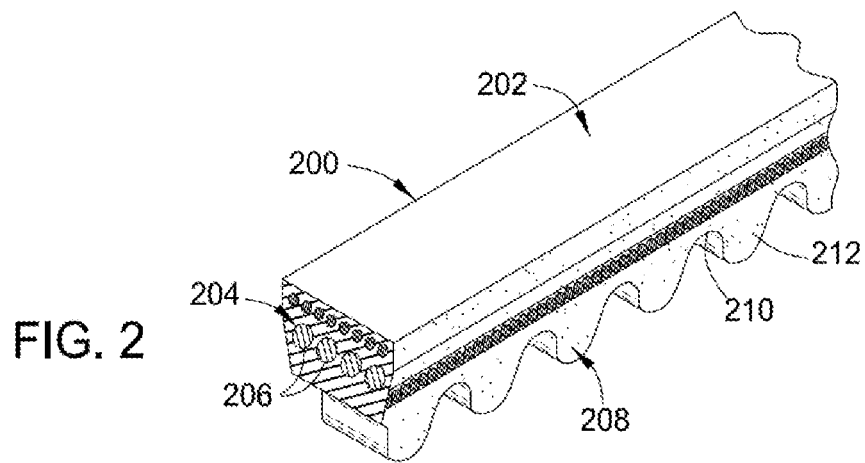
FIG. 2 is a fragmented perspective view of a transmission belt in accordance with further embodiments of the present disclosure.

FIG. 2 is a fragmented perspective view of a transmission belt according to further embodiments of the present disclosure. As shown in FIG. 2, notched V-belt 200 includes elastomeric body portion 202 and tensile layer 204 comprising cords 206. Main body portion 202 comprises one or more compositions (PEDM-containing compositions) of the present disclosure. Cords 206 comprise any suitable material, such as one or more of cotton, rayon, polyamide, polyester, aramid, steel, aluminum, glass, carbon, polyketone, polycarbonate, basalt, boron, or discontinuous fibers oriented for low load carrying capability. V-belt 200 includes sheave contact portion 208 having two juxtaposed sides of the belt, designed to wedge into a V-sheave. V-belt 200 includes troughs 210 and projections 212. Included in the category of V-belts are those V-belts designed for continuously variable transmission ("CVT") applications, which often exhibit a belt body relatively wider than the belt thickness.

Figure 3:
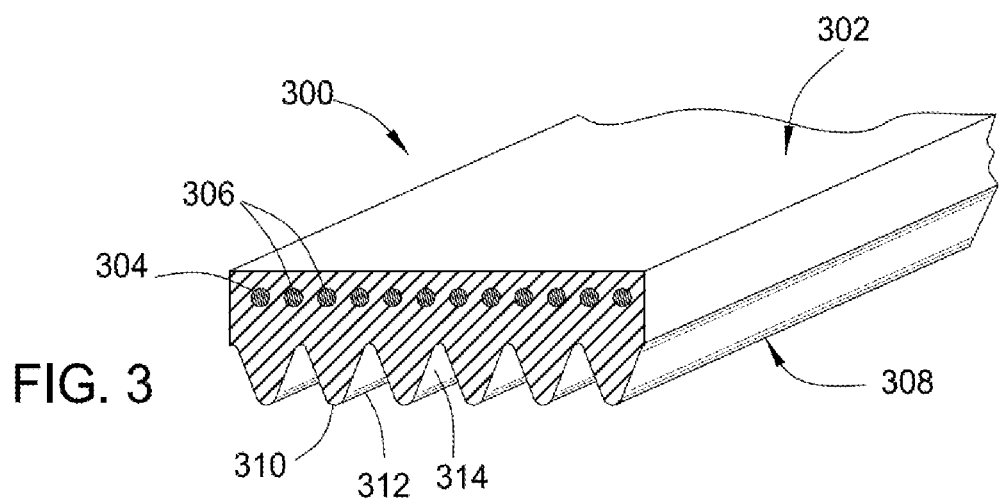
FIG. 3 is a fragmented perspective view of a transmission belt in accordance with yet further embodiments of the present disclosure.

FIG. 3 is a fragmented perspective view of a transmission belt according to one embodiment of the present disclosure. As shown in FIG. 3, multi-V-ribbed belt 300 includes main body portion 302 and also tensile reinforcement member 304 comprising cords 306. Main body portion 302 comprises one or more compositions (PEDM-containing compositions) of the present disclosure. Longitudinally grooved sheave contact portion 308 comprises a plurality of projections 310 alternating with a plurality of troughs 312 which together define driving surfaces 314 of the belt 300. In each of these instances of FIG. 1, FIG. 2, and FIG. 3, the respective sheave contact portion is coupleable/coupled with the respective main body portion and may be formed from the same material or layered with different material.

Figure 4:
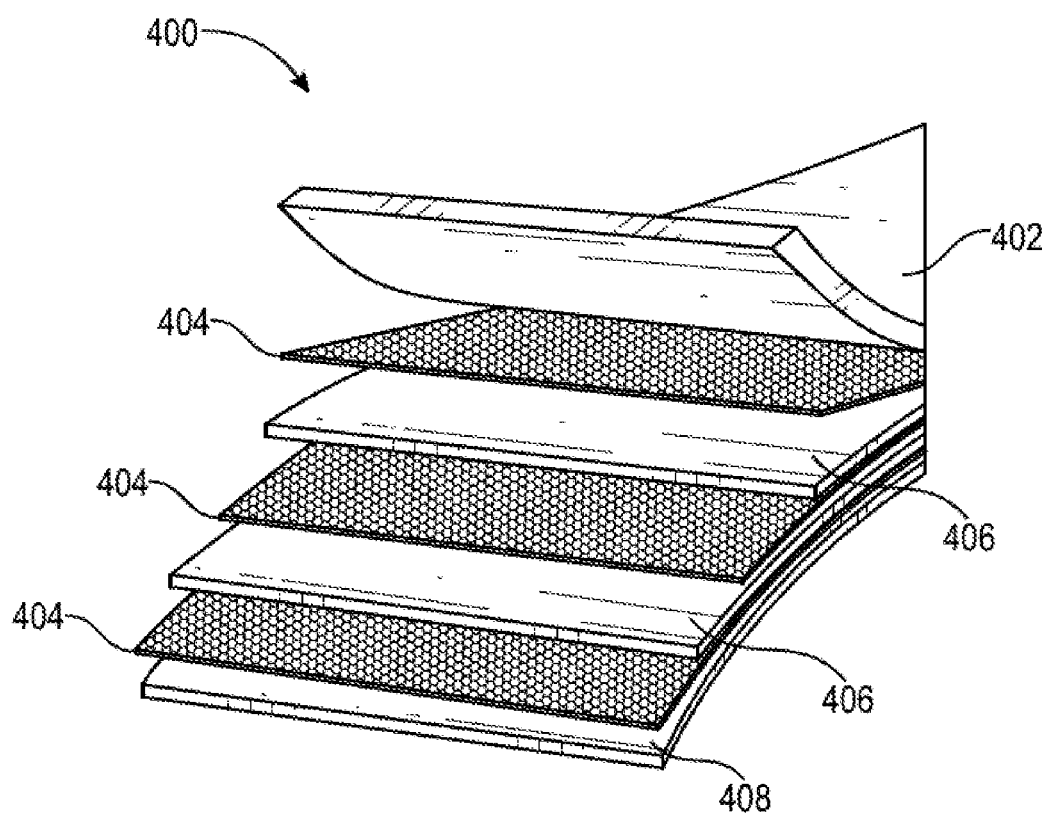
FIG. 4 illustrates an example conveyor belt construction comprising, in order, (a) a cover rubber layer, (b) alternating layers of fabric and rubber skims, and (c) a bottom rubber layer 408.

Conveyor belts can be manufactured as a layered composition of calendared sheets of compositions of the present disclosure comprising the PEDM and the ethylene-based copolymer and reinforcing fabrics. For example, FIG. 4 illustrates an example conveyor belt construction 400 comprising, in order, (a) a cover rubber layer 402, (b) alternating layers of fabric 404 and rubber skims 406, and (c) a bottom rubber layer 408. Other layers may be included in other conveyor belt constructions. The cover rubber layer 402, the rubber skims 406, and/or the bottom rubber layer 408 comprise one or more compositions of the present disclosure comprising the PEDM and the ethylene-based copolymer.

Reinforcing fabric 404 may be of any suitable configuration such as a conventional weave consisting of warp and weft threads at an angle, or may include warp threads held together by space pick cords, or a knitted or braided configuration, or a nonwoven fabric. Suitable fabrics include one or more of cotton, polyester, polyamide, acrylic, aramid, polyketone, polycarbonate, hemp, jute, or fiberglass.

Manufacturing conveyor belts generally proceeds by layering the above layers (or other desired layer order) using a calendaring process. Then, the calendared layered structure is cured. High tack in the rubber layers improves fusion between adjacent layers and mitigates the formation of air bubbles between layers.

In each of the exemplary belt embodiments shown in FIG. 1, FIG. 2, FIG. 3, and FIG. 4 compositions (PEDM-containing compositions) of the present disclosure that form the main belt body portion, may further comprise any suitable polymer. Suitable additional polymers include polyurethane elastomers (including as well polyurethane/urea elastomers and so-called millable gums) (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), polyepichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); ethylene butene terpolymers (EBDM); ethylene vinylacetate elastomers (EVM); ethylene methylacrylate (EAM); and silicone rubber.

To form the elastomeric belt body portion of a belt in accordance with at least one embodiment of the present disclosure, the polymers may be blended according to known mixing methods and, as described above, with conventional rubber compounding ingredients including but not limited to fillers, plasticizers, stabilizers, vulcanization agents/curatives, coagents, and accelerators, in amounts conventionally employed.

Hoses

Figure 5:
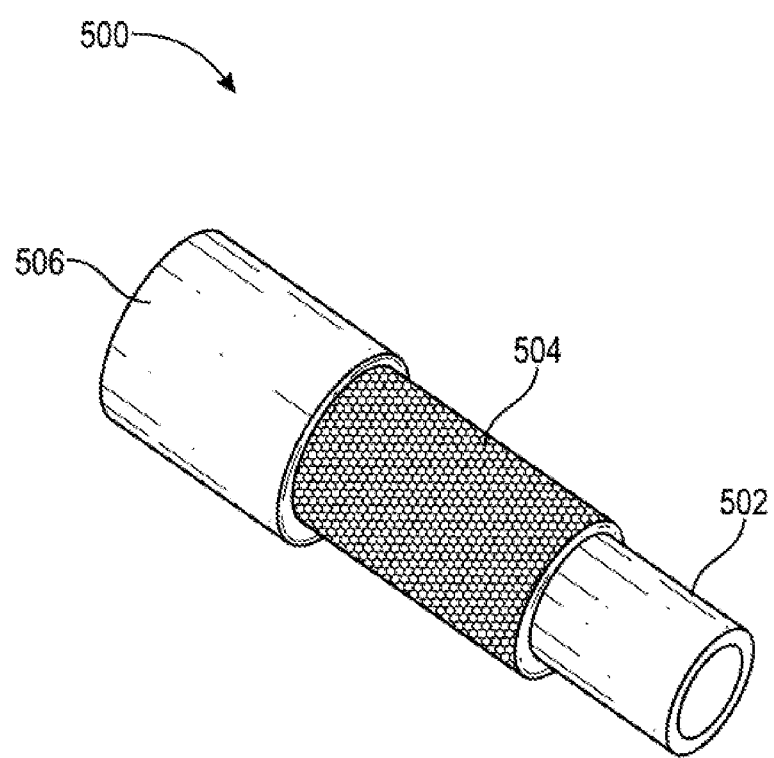
FIG. 5 illustrates an example hose construction comprising, in order, (a) an inner rubber tubular, (b) a reinforcing fabric, and (c) an outer rubber layer.

Hoses can be manufactured as layered compositions by extrusion of compositions of the present disclosure comprising the PEDM and the ethylene-based copolymer. FIG. 5 illustrates an example hose construction 500 comprising, in order, (a) an inner rubber tubular 502, (b) a reinforcing fabric 504, and (c) an outer rubber layer 506. Other layers may be included in other hose constructions. The inner rubber tubular 502 and/or the outer rubber layer 506 may comprise one or more compositions of the present disclosure comprising the PEDM and the ethylene-based copolymer.

Reinforcing fabric 504 may be of any suitable configuration such as a conventional weave consisting of warp and weft threads at an angle, or may include warp threads held together by space pick cords, or a knitted or braided configuration, or a nonwoven fabric. Suitable fabrics include one or more of cotton, polyester, polyamide, acrylic, aramid, polycarbonate, polyketone, hemp, jute, or fiberglass.

Manufacturing hoses generally proceeds by extruding the inner rubber tubular 502, covering the inner rubber tubular 502 with the reinforcing fabric 504, and extruding the outer rubber layer 506 onto the reinforcing fabric 504. High tack in the rubber layers improves fusion between adjacent layers and mitigates the formation of air bubbles between layers.

Roofing

Various roofing materials can be manufactured by extrusion of compositions of the present disclosure comprising the PEDM and the ethylene-based copolymer. Such materials may benefit from the improvement in tack and retention of physical properties, particularly when compared to formulations including conventional hydrocarbon tackifying resins.

An exemplary roofing material application of the compositions disclosed herein is a roofing membrane. The roofing membrane may be a single layer or multilayer structure, optionally including a fiber or cord reinforcement. Advantageously, in some embodiments, a composition comprising the PEDM and ethylene-based copolymer, such as an EPDM, are extruded as a layer to form a part of the roofing material. Such roofing membranes, improved by the use of compositions including PEDM polymers disclosed herein may have improved tack while improving or maintaining the rheology or physical properties of the composition.

Other Mechanical Goods

Compositions of the present disclosure may be used as one or more components of industrial and garden hoses, both molded and extruded sponge parts, and gaskets and seals. In such components, the compositions of the present disclosure (comprising the PEDM, the ethylene-based copolymer, and optionally one or more additives) may be adhered to another polymer composition including cotton, rayon, polyamide, polyester, aramid, steel, aluminum, glass, carbon, polyketone, polycarbonate, basalt, and boron, each of which may be in a form that includes a film, a belt, a hose, a tire, a woven fabric, or a nonwoven fabric. Because of the enhanced adhesion properties of the compositions of the present disclosure, the adherence to the foregoing materials may be significantly better than adherence between EP(D)M and the material. For example, adhesion between a film having a composition of the present disclosure and a film/substrate of polycarbonate, aluminum or stainless steel may have a rubber to substrate tack exceeding 10 gm force/inch width. Additionally, polycarbonate, aluminum, or stainless steel fibers/substrates may adhere more strongly to the compositions of the present disclosure than an EP(D)M alone.

EXAMPLES

Mooney viscosity (ML) can be determined by ASTM D1646-17 ((1+4), 125° C., 2 s$^{-1}$ shear rate). Ethylene content is determined using FTIR according the ASTM D3900 and is not corrected for diene content. ENB is determined using FTIR according to ASTM D6047.

Molecular Weight Determination by Polymer Char GPC-IR Hyphenated with Multiple Detectors Unless otherwise indicated, the distributions and the moments of molecular weight (number average molecular weight (Mn), weight average molecular weight (Mw), and z-average molecular weight (Mz), Mw/Mn, etc.) are determined by using a high temperature Gel Permeation Chromatography (Polymer Char GPC-IR) equipped with a multiple-channel band-filter based Infrared detector IRS, an 18-angle Wyatt Dawn Heleos light scattering detector and a 4-capillary viscometer with Wheatstone bridge configuration. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and viscometer detector are contained in ovens maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 2 hour for the polypropylene samples. The concentration (c), at each point in the chromatogram is calculated from the baseline-subtracted IRS broadband signal intensity (I), using the following equation: c=βI, where β is the mass constant. The mass recovery is calculated from the ratio of the integrated area of the concentration chromatography over elution volume and the injection mass which is equal to the predetermined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1} \log M_{PS}$$

where the variables with subscript "PS" stand for polystyrene while those without a subscript are for the test samples. In this method, $\alpha_{PS}=0.67$ and $K_{PS}=0.000175$ while a and K are for other materials as calculated from empirical equations (Sun, T. et al. Macromolecules 2001, 34, 6812). Here the concentrations are expressed in g/cm$^3$, molecular weight is expressed in g/mole, and intrinsic viscosity (hence K in the Mark-Houwink equation) is expressed in dL/g unless otherwise noted.

The LS molecular weight (M) at each point in the chromatogram is determined by analyzing the LS output using the Zimm model for static light scattering $$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IRS analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For purposes of the present disclosure and the claims thereto (dn/dc)=0.1048 for ethylene-propylene copolymers, and (dn/dc)=0.1048-0.0016ENB for EPDM comprising ENB as the diene, where ENB is the ENB content in wt % in the ethylene-propylene-diene terpolymer. Where other non-conjugated polyenes are used instead of (or in addition to) ENB, the ENB is taken as weight percent of total non-conjugated polyenes.

A high temperature Polymer Char viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s k$, where c is concentration and is determined from the IRS broadband channel output.

Differential Scanning calorimetry (DSC) was used to determine glass transition temperature (Tg), melting temperature (Tm), and heat of fusion (Hf) of the polymers according to ASTM D3418-03 using a TA Instruments model Q200 machine. Samples weighing approximately 5-10 mg were kept in an aluminum sample pan and hermetically sealed. These were gradually heated to 200° C. at a rate of 10° C./minute and thereafter, held at 200° C. for 2 minutes. They were subsequently cooled to −90° C. at a rate of 10° C./minute and held isothermally for 2 minutes at −90° C. This was followed by a second heating cycle wherein the samples were heated to 200° C. at 10° C./minute. Both the first and second cycle thermal events were recorded.

During the second heating cycle, appearance of melting indicates crystallinity and thus measured heat of fusion is used to compute the crystallinity unless otherwise indicated. The thermal output, recorded as the area under the melting peak of the sample, is a measure of the heat of fusion and may be expressed in Joules per gram of polymer. The melting point is recorded as the temperature of the greatest heat absorption within the range of melting of the sample relative to a baseline measurement for the increasing heat capacity of the polymer as a function of temperature.

The percent crystallinity is calculated using the formula: [area under the curve (in J/g)/H° (in J/g)]*100, where H° is the ideal heat of fusion for a perfect crystal of the homopolymer of the major monomer component. These values for H° are to be obtained from the Polymer Handbook, Fourth Edition, published by John Wiley and Sons, New York 1999, except that a value of 290 J/g is used for H° (polyethylene), a value of 140 J/g is used for H° (polybutene), and a value of 207 J/g is used for H° (polypropylene).

Tg was determined from the second heating cycle of DSC.

The $^{13}C$ solution NMR was performed on a 10 mm cryoprobe with a field strength of at least 600 MHz solvent mixture of ODCB (ortho-dichlorobenzene) and benzene-d6 ($C_6D_6$) (90:10) at 120° C. with a flip angle of 90° and inverse gated decoupling with a 20 second delay. Sample preparation (polymer dissolution) was performed at 140° C. where 0.20 grams of polymer was dissolved in an appropriate amount of solvent to give a final polymer solution volume of 3 ml. Chemical shifts were referenced to the solvent signal at 127.2 ppm.

The tacticity is calculated from integrating the $CH_3$ region of the propylene unit where the regions are defined as:

| mm region | 21.20-20.5 ppm |
| mr region | 20.5-19.75 ppm |
| rr region | 19.75-18.7 ppm |

To account for the portion of the EP sequence that overlaps in the mr and rr regions, the CH EPE peak at 32.8 ppm and the CH EPP peak at 30.5 ppm were used to remove the EPE and EPP contribution.

| mm region | 21.20-20.5 ppm |
| mr region | (20.5-19.75 ppm - CH EPP) |
| rr region | (19.75-18.7 ppm - CH EPE) |

The sum or "total" of the integrals of the mm, mr and rr regions are used to calculate the percentage of mm, mr and rr triads where "total"=mm+mr+rr.

% mm=mm*100/total

% mr=mr*100/total

% rr=rr*100/total

Regio-defects and ENB sequence effects are not accounted for in the tacticity calculation. Their contribution is assumed to be negligible.

Percent dyad, m and r, are calculated from:

m=% mm+(0.5*% mr)

r=% rr+(0.5*% mr).

The "propylene tacticity index", expressed herein as [m/r], is calculated from the corrected integral regions as described above. When [m/r] is 0 to less than 1.0, the polymer is generally described as syndiotactic, when [m/r] is 1.0 the polymer is atactic, and when [m/r] is greater than 1.0 the polymer is generally described as isotactic.

The EP(D)M polymers used were VISTALON™ 706, which is an ethylene-propylene copolymer having a Mooney Viscosity (ML, 1+4 @ 125° C.) of 42 MU and an ethylene content of 65 wt %; VISTALON™ 7500, which is ethylene-propylene-diene terpolymer having a Mooney Viscosity (ML, 1+4 @ 125° C.) of 91 MU, an ethylene content of 56 wt %, and an ENB content of 5.7%; VISTALON™ 2504, which is ethylene-propylene-diene terpolymer having a Mooney Viscosity (ML, 1+4 @ 125° C.) of 25 MU, an ethylene content of 58 wt %, and an ENB content of 4.7%, and VISTALON™ 9301, which is ethylene-propylene-diene terpolymer having a Mooney Viscosity (ML, 1+4 @ 125° C.) of 67 MU, an ethylene content of 69 wt %, and an ENB content of 2.8% as indicated in the following Tables. The PEDM polymers were made by a polymerization process described in PCT/US2019/022738, filed Mar. 18, 2019, and PCT/US2019/022764, filed on Mar. 18, 2019, the disclosures of which are incorporated herein in their entirety.

Table 1 illustrates the polymer characteristics of several PEDM polymers used in making a plurality of compounds.

TABLE 1

PE(D)M Polymers

| Sample | C2 by FTIR (wt %) | ENB by FTIR (wt %) | ML(1 + 4) at 125° C. (MU) | $T_g$ (° C.) | Hf (J/g) | mm | mr | rr | m | r | m/r |
|---|---|---|---|---|---|---|---|---|---|---|---|
| Samp-1 | 5.3 | 2.9 | 54 | −6.5 | 0 | | | | | | |
| Samp-2 | 22.0 | 5.3 | 13 | −23.5 | 0 | | | | | | |
| Samp-3 | 21.5 | 5.4 | 43 | −22.7 | 0 | | | | | | |
| Samp-4 | 21.2 | 5.4 | 77 | −22.9 | 0 | | | | | | |
| Samp-5 | 38.5 | 5.3 | 13 | −41.3 | 0 | | | | | | |
| Samp-6 | 36.1 | 5.6 | 69 | −38.4 | 0 | | | | | | |
| Samp-7 | 9.7 | 2.7 | 17 | −13.6 | 0 | | | | | | |
| Samp-8 | 9.8 | 3.0 | 51 | −12.8 | 0 | 0.19 | 0.27 | 0.54 | 0.33 | 0.67 | 0.49 |
| Samp-9 | 9.9 | 3.0 | 74 | −11.3 | 0 | 0.20 | 0.25 | 0.55 | 0.32 | 0.68 | 0.48 |
| Samp-10 | 9.9 | 5.1 | 16 | −10.6 | 0 | 0.19 | 0.26 | 0.54 | 0.32 | 0.68 | 0.48 |
| Samp-11 | 10.2 | 5.2 | 54 | −9.8 | 0* | 0.18 | 0.25 | 0.56 | 0.31 | 0.69 | 0.45 |
| Samp-12 | 10.0 | 5.3 | 85 | −10.1 | 0 | 0.20 | 0.25 | 0.55 | 0.33 | 0.67 | 0.48 |
| Samp-13 | 5.5 | 2.7 | 16 | −8.6 | 0 | | | | | | |
| Samp-14 | 14.7 | 2.9 | 15 | −18.4 | 0 | | | | | | |

*Hf of the Samp-11 was still 0 J/g (undetectable) after the DSC experiment and subsequently aging at room temperature for 3 months as measured from the first heating cycle.

TABLE 1

PE(D)M Polymers (continued)

| Sample | $M_n$ (LS) (g/mol) | $M_w$ (LS) (g/mol) | Mz (LS) (g/mol) | $M_w$(LS)/$M_n$(LS) |
|---|---|---|---|---|
| Samp-1 | 145809 | 313207 | 510066 | 2.15 |
| Samp-2 | 56138 | 142352 | 272255 | 2.54 |
| Samp-3 | 105230 | 262442 | 530104 | 2.49 |
| Samp-4 | 149209 | 436793 | 1169160 | 2.93 |
| Samp-5 | 41354 | 115507 | 227559 | 2.79 |
| Samp-6 | 111831 | 277570 | 547350 | 2.48 |
| Samp-7 | 78064 | 164111 | 263810 | 2.10 |
| Samp-8 | 144469 | 314936 | 552424 | 2.18 |
| Samp-9 | 177786 | 390369 | 730778 | 2.20 |
| Samp-10 | 79165 | 172067 | 301958 | 2.17 |
| Samp-11 | 146835 | 340152 | 711549 | 2.32 |
| Samp-12 | 183836 | 477910 | 1193893 | 2.60 |
| Samp-13 | 77500 | 183623 | 321521 | 2.37 |
| Samp-14 | 67839 | 165048 | 290179 | 2.43 |

Compositions suitable for transmission belt applications were formulated using Vistalon™ 706 and Vistalon™ 2504 as the EPDM base polymer. Table 2 shows a peroxide cured EPDM belt formulation used in the Examples. The control formulation contains Vistalon™ 706 or Vistalon™ 2504 EP(D)M. Polymer content is 100 phr, which includes both the EPDM control polymer and PEDM; i.e., a portion of the EPDM was replaced by the PEDM polymer at a level of 20, 30, or 100 phr. One or two PEDM polymers were used in the formulations. The compounding was conducted in a Banbury OOC mixer, which has a mixer volume of 4.3 L. The fill factor was 70%. The masterbatch formulations, with the exclusion of the curatives were prepared in the first pass at 50 RPM with a sweep at 140° F., a sweep at 200° F., and a sweep at 240° F. and Ram of 60 psi. The average batch discharge temperature of the first pass from the mixer was about 300° F. The curatives were added in a second pass to finalize the compound.

TABLE 2

Belt formulation and mixing

| Component | PHR |
|---|---|
| Polymer | 100 |
| Black 330 | 60 |

TABLE 2-continued

Belt formulation and mixing

| Component | PHR |
|---|---|
| Dymalink 708 (ZDMA) | 15 |
| Sunpar 2280 | 10 |
| Zinc Oxide | 5.0 |
| Zinc Stearate | 2.0 |
| Agerite Resin D | 1.0 |
| Mill addition (entire batch) | |
| Vulcup 40 KE | 5.0 |
| Dymalink 719 | 0.3 |

In Table 2, "Polymer" indicates the respective amount of the EP(D)M plus PEDM polymer; Black 330 is a carbon black (pellet form available from Cabot); SUNPAR™ 2280 is a paraffinic process oil; Zinc Stearate and ZnO (zinc oxide) are vulcanization activators; AGERITE™ RESIN D™ is the antioxidant 1,2-dihydro-2,2,4-trimethylquinoline (available from Vanderbilt Chemicals); DYMALINK™ 708 (ZDMA) and DYMALINK™ 719 are each vulcanization activators; and VULCUP™ 40 KE is an organic peroxide vulcanizing/crosslinking agent.

Compositions suitable for hose applications were formulated using Vistalon™ 7500 as the EPDM base polymer. Polymer content is 100 phr, which includes both the Vistalon™ 7500 polymer and PEDM; i.e., a portion of the Vistalon™ 7500 EPDM was replaced by the PEDM polymer at a level of 10 or 20 phr. The compounding was conducted in a Banbury OOC mixer, which has a mixer volume of 4.3 L. The fill factor was 70%. The masterbatch formulations, with the exclusion of the curatives was prepared in the first pass as described in Table 3. The average batch discharge temperature from the mixer was about 300° F. The curatives were added in a second pass to finalize the compound.

TABLE 3

Hose formulation and mixing

| Peroxide cure | phr |
|---|---|
| First Pass | |
| VISTALON ™ 7500 + PEDM | 100 |
| N550 Carbon Black | 110 |
| Paraffinic Oil (SUNPAR ™ 2280) | 45 |
| AGERITE ™ Resin D ™ | 1.5 |
| EGDMA | 2 |
| Second Pass | |
| VULCUP ™ 40 KE | 7 |
| TOTAL: | 265.5 |
| 1st PASS MASTERBATCH | |
| 50 RPM | |
| 0' - Add polymer, black, oil, etc. | |
| Sweep @ 140° F. | |
| Sweep @ 220° F. | |
| Sweep @ 300° F. | |
| Ram Pressure 60 psi | |
| 2nd PASS FINAL | |
| 50 RPM | |
| 0' - Add masterbatch and VULCUP ™ 40 KE | |
| Sweep @ 140° F. | |
| Sweep @ 160° F. | |
| Ram Pressure 60 psi | |

Compositions suitable for roofing applications were formulated using Vistalon™ 9301 as the EPDM base polymer. Polymer content is 100 phr, which includes both the Vistalon™ 9301 polymer and PEDM; i.e., a portion of the Vistalon™ 9301 EPDM was replaced by the PEDM polymer at a level of 5, 10, or 20 phr. The compounding was conducted in a Banbury OOC mixer, which has a mixer volume of 4.3 L. The fill factor was 70%. The masterbatch formulations, with the exclusion of the curatives was prepared in the first pass as described in Table 3. The average batch discharge temperature from the mixer was about 300° F. The curatives were added in a second pass to finalize the compound.

TABLE 4

Roofing formulation and mixing

| Peroxide cure | phr |
|---|---|
| First Pass | |
| VISTALON ™ 9301 + PEDM | 100 |
| Carbon black N 650 | 95 |
| CaCO3 | 50 |
| Sunpar ™ 2280 | 60 |
| ZnO | 4 |
| Steric acid | 2 |
| CaO | 4 |
| Escorez ™ 1102 | Optional (5, 10, or 20) |
| Second Pass | |
| Sulfur-80 | 1.2 |
| MBTS | 0.8 |

TABLE 4-continued

Roofing formulation and mixing

| Peroxide cure | phr |
|---|---|
| TMTD-75 | 0.9 |
| Butyl Zimate | 0.5 |
| TOTAL: | 318.4 |
| 1st PASS MASTERBATCH | |
| 50 RPM (drop temperature 150° C., upside down) | |
| 2nd PASS FINAL | |
| 50 RPM (drop temperature 105° C.) | |

In Table 4, Escorez™ 1102 is a tackifier with low molecular weight (available from ExxonMobil); Sulfur-80 is a curing agent; MBTS, TMTD-75, and Butyl Zimate are vulcanization accelerators.

The formulations were compression molded and tested for various physical properties using appropriate ASTM methods. Compound ML at 100° C. was measured by the ASTM D1646-17 method. Mooney scorch is measured according to ASTM D1646-17 test method. Moving Die Rheometer (MDR) was measured by the ASTM D5289 method. Mechanical properties, including hardness, tensile strength, elongation, and green strength were measured by the ASTM D412 method. Compression set was measured by the ASTM D395-B method. Die C tear strength was measured by the ASTM D624 method. Tensile and elongation after oil aging were measured by the ASTM D471 method.

The rubber-to-rubber tack/green tack testing was carried out based on Modified ASTM D3330/D330M-04(2010) Method B and F. This modified method employed elements of Method B and Method F within the parameters of the standard. Method B calls for application to material of interest not stainless steel. Method F calls for a 90° angle for thicker more rigid backings. In particular, the following modifications to the ASTM method were utilized: (1) instead of a 2 µm finish stainless steel substrate per the ASTM method, an uncured rubber sheeting test specimen (top sample) and test substrate (bottom sample) of the same rubber being tested or a substrate of polycarbonate, stainless steel and aluminum (2 inch×6 inch) was used; (2) for conditioning, instead of the 24 hours at 23° C. in the ASTM method, the sample was tested at ambient condition; (3) default dwell time was 1 min unless specified otherwise. Average tack values from about 5 to 10 replicates were reported with a typical coefficient of variation of approximately 20% or less.

The rubber-to-rubber/green tack testing of belt compounds was conducted using calendered EPDM/PEDM compound samples. The EPDM/PEDM compounds were initially milled on a 10 inch×20 inch roll mill made by Kobelco Stewart Bolling, Inc. (KSBI). The roll temperatures were set at 180° F. for back roll and 170° F. for the front roll. These compounds were sent hot to the Calender for processing. Calendered samples were prepared on a laboratory three-roll 6 inch×13 inch calendar by KSBI. For EPDM/PEDM materials; the top roll was set at 180° F., the middle roll was set at 150° F. and the bottom roll remained at room temperature. The target gauge thickness was set between 30-40 gauge (0.030-0.040 inches).

The rubber-to-rubber/green tack testing of hose compounds was conducted using extruded EPDM/PEDM compound samples. Extruded EPDM/PEDM compound samples were prepared using a Haake polylab system. Haake polylab system consists of the Rheocord which drive and control the measuring sensor, and measuring sensor is the extruder, which is known as a Rheomex, and post extrusion equipment. The temperature zones were set as follows: Throat (70° C.), Barrel (80° C.), Screw (80° C.) and Die (90° C.). The extrusion rate was set at 30 rpm. The target gauge thickness was set between 30-40 gauge (0.030-0.040 inches).

The test substrate can be composed of 2 inch×6 inch uncured rubber compound or other polar substrates as describe above. The test strip or test specimen of same compound backed with non-extensible tape 1 inch×6 inch. As directed in the method, apply rubber to rubber/polar substrate with a ChemInstruments RD-3000 automated roll down machine with a 4.5 pound roller for consistent application for 2 cycle roll down. After 1 minute of contact (dwell time), removed bonded strip and measured the removal force on the ChemInstruments AR-2000—Adhesion/Release tester while maintaining a 90° peel. Removal speed was 1 inch/minute. The measured adhesion area was 3 inch$^2$ with approximately 1000 data points. Low tack compounds may not maintain a 90° angle. The method has a detection limit about 5 gm/inch. The substrates of polycarbonate (Bayer Markolon Polycarbonate Plastic), stainless steel (304 Stainless Steel 2µ Finish), and Aluminum (Q-Panel Bare Aluminum 3003 H14 Alloy) were acquired from ChemInstruments.

Table 5 shows properties of belt compounds. In general, E1.1, E1.2, and E1.3 showed a better balance of tack and curing/physical properties (e.g., curing state (MH-ML), modulus and tear strength after curing) than C1.1, C1.2, C1.3 and C1.4.

TABLE 5

Belt Compound Properties

| Sample ID | C1.1 | C1.2 | E1.1 | E1.2 | E1.3 | C1.3 | C1.4 |
|---|---|---|---|---|---|---|---|
| VISTALON™ 706 loading (phr) | 100 | 80 | 80 | 80 | 80 | 80 | 80 |
| Sample ID | N.A. | Samp-1 | Samp-2 | Samp-3 | Samp-4 | Samp-5 | Samp-6 |
| PEDM loading (phr) | 0 | 20 | 20 | 20 | 20 | 20 | 20 |
| Properties in green state | | | | | | | |
| Green tack (gram/inch) | 9 | 98 | 124 | 107 | 410 | 56 | 50 |
| Green tack after aging at room temp. for 1 month (gram/inch) | <5 | 66 | 41 | 53 | 141 | 36 | <5 |
| Compound ML at 100° C. (MU) | 99 | 105 | 91 | 99 | 108 | 90 | 109 |
| Stress @ 10% strain (MPa) | 0.93 | 0.9 | 0.94 | 0.89 | 0.98 | 0.80 | 0.94 |
| Stress @ 25% strain (MPa) | 1.21 | 1.14 | 1.17 | 1.1 | 1.26 | 0.97 | 1.17 |
| Die C Tear Strength (N/mm) | 18.8 | 18.8 | 17.0 | 18.9 | 17.4 | 14.6 | 17.9 |
| Curing properties | | | | | | | |
| MH-ML (dN · m) | 29.7 | 26.4 | 29.2 | 30.3 | 30.3 | 30.5 | 31.9 |
| t90 (min) | 4.2 | 4.1 | 4.7 | 4.4 | 4.3 | 4.8 | 4.4 |
| ts2 (min) | 0.45 | 0.47 | 0.47 | 0.47 | 0.46 | 0.47 | 0.44 |
| Peak Rate (dNm/min) | 24.7 | 24.8 | 22.6 | 25.7 | 25.7 | 23.3 | 28.3 |
| Properties after cure (press cure at 180° C. for 30 min) | | | | | | | |
| Modulus at 100% elongation (MPa) | 4.4 | 4.6 | 4.6 | 5.0 | 5.5 | 4.9 | 5.4 |
| Modulus at 200% elongation (MPa) | 11.4 | 11.1 | 11.9 | 13.3 | 14.2 | 12.2 | 14.1 |
| Die C Tear Strength (N/mm) | 60.1 | 55.6 | 54.7 | 57.1 | 61.4 | 61.4 | 63.1 |
| Properties after oven aging at 150° C. for 7 days (after press cure at 180° C. for 30 min) | | | | | | | |
| Die C Tear Strength (N/mm) | 62.2 | 56.2 | 58.9 | 60.4 | 61.0 | 61.5 | 66.4 |
| Die C Tear Strength Retained (%) | 103 | 101 | 108 | 106 | 99 | 100 | 105 |

Table 6 shows properties of hose compounds. In general, E2.1 (with Samp-11) and E2.2 (with Samp-12) showed a better balance of tack (before and after aging) and curing/physical properties (e.g., curing state, green tear strength, and tensile strength after curing, and tensile strength and elongation after oil aging) than the controls (C2.1-C2.6).

TABLE 6

Hose Compound Properties

| Sample ID | C2.1 | C2.2 | C2.3 | C2.4 | C2.5 | C2.6 | E2.1 | E2.2 |
|---|---|---|---|---|---|---|---|---|
| VISTALON™ 7500 loading (phr) | 100 | 80 | 80 | 80 | 80 | 80 | 80 | 80 |
| Sample ID | N.A. | Samp-1 | Samp-7 | Samp-8 | Samp-9 | Samp-10 | Samp-11 | Samp-12 |
| PEDM loading (phr) | 0 | 20 | 20 | 20 | 20 | 20 | 20 | 20 |

TABLE 6-continued

Hose Compound Properties

| Sample ID | C2.1 | C2.2 | C2.3 | C2.4 | C2.5 | C2.6 | E2.1 | E2.2 |
|---|---|---|---|---|---|---|---|---|
| *Properties in green state* | | | | | | | | |
| Green tack (gram/inch) | 1499 | 2760 | 2213 | 2378 | 3077 | 2288 | 3093 | 2694 |
| Green tack after aging at room temp. for 1 month (gram/inch) | 1190 | 1934 | 1679 | 1917 | 1974 | 1777 | 3448 | 2166 |
| Compound ML at 100° C. (MU) | 97 | 99 | 94 | 102 | 105 | 93 | 103 | 104 |
| Stress @ 10% strain (MPa) | 0.39 | 0.38 | 0.40 | 0.41 | 0.43 | 0.42 | 0.42 | 0.42 |
| Stress @ 25% strain (MPa) | 0.50 | 0.48 | 0.53 | 0.53 | 0.55 | 0.53 | 0.55 | 0.54 |
| Die C Tear Strength (N/mm) | 5.4 | 5.3 | 4.8 | 4.8 | 5.8 | 5.2 | 5.5 | 5.7 |
| *Curing properties* | | | | | | | | |
| MH-ML (dN·m) | 18.9 | 16.0 | 16.3 | 16.7 | 16.5 | 17.0 | 18.3 | 17.2 |
| t90 (min) | 5.3 | 5.2 | 5.3 | 5.0 | 5.1 | 5.1 | 5.2 | 5.2 |
| ts2 (min) | 0.71 | 0.81 | 0.85 | 0.79 | 0.80 | 0.73 | 0.75 | 0.79 |
| *Properties after cure (press cure at 180° C. for 30 min)* | | | | | | | | |
| Hardness (Shore A) | 67 | 67 | 68 | 66 | 67 | 69 | 68 | 68 |
| Tensile Strength (MPa) | 16.9 | 13.5 | 13.9 | 11.9 | 13.9 | 13.7 | 15.7 | 14.7 |
| Modulus at 100% elongation (MPa) | 5.5 | 5.1 | 5.2 | 4.9 | 5.0 | 5.1 | 5.4 | 5.0 |
| Elongation (%) | 239 | 221 | 223 | 198 | 226 | 214 | 227 | 225 |
| *Properties after oil aging at 100° C. for 24 hours (after press cure at 180° C. for 30 min)* | | | | | | | | |
| Tensile Strength (MPa) | 5.9 | 4.6 | 4.4 | 3.9 | 4.4 | 5.1 | 5.6 | 5.9 |
| Elongation (%) | 99 | 91 | 87 | 82 | 88 | 96 | 100 | 104 |
| Tensile Strength Retained (%) | 35 | 34 | 32 | 33 | 32 | 37 | 35 | 40 |
| Elongation Retained (%) | 41 | 41 | 39 | 41 | 39 | 45 | 44 | 46 |

Table 7 shows properties of belt compounds. In general, E3.1 and E3.2 showed a better balance of tack and curing/physical properties (e.g. curing state, hardness, tensile strength, modulus, and tear strength after curing) than C3.1 and C3.2.

TABLE 7

Belt Compound Properties

| Sample ID | C3.1 | C.3.2 | E3.1 | E3.2 |
|---|---|---|---|---|
| VISTALON™ 706 loading (phr) | 100 | 70 | 70 | 70 |
| Sample ID | N.A. | Samp-13 | Samp-11 | Samp-4 |
| PEDM loading (phr) | 0 | 30 | 30 | 30 |
| *Properties in green state* | | | | |
| Green tack (gram/inch) | 26 | 345 | 300 | 260 |
| Green tack after aging at room temp. for 1 month (gram/inch) | 15 | 197 | 142 | 126 |
| Compound ML at 100° C. (MU) | 103 | 90 | 104 | 112 |
| Stress @ 10% strain (MPa) | 0.93 | 0.83 | 0.83 | 0.80 |
| Stress @ 25% strain (MPa) | 1.21 | 1.03 | 1.10 | 1.06 |
| *Curing properties* | | | | |
| MH-ML (dN·m) | 31.5 | 23.3 | 26.5 | 26.2 |
| t90 (min) | 4.0 | 4.1 | 4.2 | 4.3 |
| ts2 (min) | 0.46 | 0.49 | 0.49 | 0.48 |
| *Properties after cure (press cure at 180° C. for 30 min)* | | | | |
| Hardness (Shore A) | 76 | 73 | 75 | 75 |
| Tensile Strength (MPa) | 24.9 | 18.3 | 23.2 | 23.3 |
| Modulus at 100% elongation (MPa) | 5.6 | 5.0 | 5.5 | 5.2 |

TABLE 7-continued

| | Belt Compound Properties | | | |
|---|---|---|---|---|
| Sample ID | C3.1 | C.3.2 | E3.1 | E3.2 |
| Modulus at 200% elongation (MPa) | 14.5 | 12.5 | 14.3 | 13.7 |
| Elongation (%) | 338 | 295 | 328 | 325 |
| Die C Tear Strength (N/mm) | 63.9 | 51.3 | 56.2 | 61.9 |
| Properties after oven aging at 150° C. for 7 days (after press cure at 180° C. for 30 min) | | | | |
| Tensile Strength (MPa) | 20.8 | 17.3 | 20.6 | 19.9 |
| Elongation (%) | 310 | 303 | 305 | 299 |
| Tensile Strength Retained (%) | 83 | 94 | 89 | 85 |
| Elongation Retained (%) | 92 | 103 | 93 | 92 |
| Die C Tear Strength (N/mm) | 61.7 | 51.0 | 59.2 | 59.6 |
| Die C Tear Strength Retained (%) | 97 | 100 | 105 | 96 |

Table 8 shows properties of V2504-based belt compounds. In general, E4.1, E4.2, E4.4, and E4.5 showed a better balance of tack and curing/physical properties (e.g., curing state, tensile strength, modulus, and tear strength) than C4.1, C4.2, and C4.3. In particular, E4.1 and E4.2 with PEDM-11 showed the best tack improvement and good retention in physical properties in general. In addition, E4.3 and E4.6 showed better curing and physical properties than C4.4 at 100 PEDM loading in general.

Table 9 shows properties of hose compounds. In general, E5.1, E5.2, E5.3, and E5.4 showed a better balance of tack and curing/physical properties (e.g., green strength (stress @10% and 25% strain), green tear strength, curing state, tensile strength, modulus, tear strength after curing, and tensile and elongation after oil aging) than C5.1, C5.2, and C5.3. In particular, E5.3 and E5.4 containing Samp-4 showed the best balance of tack and physical properties in general. In addition, E5.1, E5.2, E5.3, and E5.4 showed better compression set than C5.1.

TABLE 8

| | Belt Compound Properties | | | | | | | | | |
|---|---|---|---|---|---|---|---|---|---|---|
| Sample ID | C4.1 | C.4.2 | C4.3 | C4.4 | E4.1 | E4.2 | E4.3 | E4.4 | E4.5 | E4.6 |
| VISTALON ™ 2504 loading (phr) | 100 | 80 | 70 | 0 | 80 | 70 | 0 | 80 | 70 | 0 |
| PEDM ID | N.A. | Samp-13 | | | Samp-11 | | | Samp-4 | | |
| PEDM loading (phr) | 0 | 20 | 30 | 100 | 20 | 30 | 100 | 20 | 30 | 100 |
| Properties in green state | | | | | | | | | | |
| Green tack (gram/inch)* | 576 | 1397 | 1652 | | 1486 | 2805 | | 1373 | 1218 | |
| Green tack after aging at room temp. for 1 month (gram/inch) | 170 | 426 | 841 | | 505 | 738 | | 373 | 647 | |
| Compound ML at 100° C. (MU) | 83 | 68 | 65 | 54 | 82 | 82 | 110 | 84 | 86 | 133 |
| Stress @ 10% strain (MPa) | 0.65 | 0.63 | 0.59 | 0.82 | 0.60 | 0.56 | 0.75 | 0.61 | 0.65 | 0.7 |
| Stress @ 25% strain (MPa) | 0.72 | 0.71 | 0.68 | 0.91 | 0.70 | 0.67 | 0.92 | 0.70 | 0.76 | 0.89 |
| Curing properties | | | | | | | | | | |
| MH-ML (dN · m) | 31.0 | 25.8 | 22.9 | 8.9 | 28.4 | 27.6 | 19.1 | 30.5 | 29.9 | 24.0 |
| t90 (min) | 5.4 | 5.4 | 5.4 | 4.1 | 5.3 | 5.4 | 4.8 | 5.3 | 5.3 | 4.8 |
| ts2 (min) | 0.50 | 0.51 | 0.53 | 0.65 | 0.51 | 0.50 | 0.55 | 0.49 | 0.50 | 0.53 |
| Properties after cure (press cure at 180° C. for 30 min) | | | | | | | | | | |
| Hardness (Shore A) | 77 | 73 | 73 | 72 | 75 | 74 | 73 | 75 | 75 | 75 |
| Tensile Strength (MPa) | 21.4 | 18.7 | 17.0 | 7.4 | 20.3 | 21.8 | 17.8 | 19.2 | 21.3 | 20.2 |
| Modulus at 100% elongation (MPa) | 7.8 | 6.7 | 6.2 | 2.8 | 7.2 | 7.2 | 4.2 | 7.6 | 7.6 | 4.9 |
| Modulus at 200% elongation (MPa) | 19.0 | 16.0 | 14.7 | 4.2 | 17.8 | 17.4 | 9.4 | 18.5 | 18.6 | 11.9 |
| Elongation (%) | 222 | 230 | 231 | 512 | 222 | 244 | 382 | 206 | 225 | 327 |
| Die C Tear Strength (N/mm) | 52.8 | 46.3 | 43.9 | 36.7 | 50.2 | 50.9 | 46.1 | 53.5 | 55.7 | 50.9 |
| Properties after oven aging at 150° C. for 7 days (after press cure at 180° C. for 30 min) | | | | | | | | | | |
| Tensile Strength (MPa) | 18.5 | 16.2 | 15.9 | 6.8 | 17.5 | 19.9 | 16.2 | 19.1 | 19.1 | 16.3 |
| Elongation (%) | 169 | 184 | 196 | 402 | 173 | 202 | 310 | 187 | 188 | 230 |
| Die C Tear Strength (N/mm) | 50.9 | 48.9 | 46.4 | | 52.9 | 52.9 | | 55.3 | 53.3 | |

*There was challenge in preparing good samples of the C4.4, E4.3, and E4.6 for the quantitative green tack testing, but all of them showed significant tack as assessed qualitatively by hands

TABLE 9

Hose Compound Properties

| Sample ID | C5.1 | C.5.2 | C5.3 | E5.1 | E5.2 | E5.3 | E5.4 |
|---|---|---|---|---|---|---|---|
| VISTALON ™ 7500 loading (phr) | 100 | 90 | 80 | 90 | 80 | 90 | 80 |
| Sample ID | N.A. | Samp-13 | | Samp-11 | | Samp-4 | |
| PEDM loading (phr) | 0 | 10 | 20 | 10 | 20 | 10 | 20 |
| *Properties in green state* | | | | | | | |
| Green tack (gram/inch) | 1684 | 2055 | 2007 | 2290 | 4787 | 4522 | 2346 |
| Green tack after aging at room temp. for 1 month (gram/inch) | 1409 | 2580 | 1899 | 2049 | 2908 | 4274 | 2252 |
| Compound ML at 100° C. (MU) | 105 | 98 | 90 | 104 | 102 | 105 | 108 |
| Stress @ 10% strain (MPa) | 0.42 | 0.42 | 0.37 | 0.44 | 0.43 | 0.44 | 0.44 |
| Stress @ 25% strain (MPa) | 0.54 | 0.53 | 0.46 | 0.56 | 0.56 | 0.57 | 0.58 |
| Die C Tear Strength (N/mm) | 5.6 | 5.2 | 4.9 | 5.7 | 5.2 | 5.3 | 5.6 |
| *Curing properties* | | | | | | | |
| MH-ML (dN · m) | 19.1 | 17.5 | 15.7 | 18.7 | 16.9 | 18.1 | 17.4 |
| t90 (min) | 5.13 | 5.08 | 5.04 | 4.98 | 5.14 | 5.09 | 4.99 |
| ts2 (min) | 0.70 | 0.73 | 0.76 | 0.83 | 0.78 | 0.74 | 0.74 |
| *Properties after cure (press cure at 180° C. for 30 min)* | | | | | | | |
| Hardness (Shore A) | 68 | 67 | 69 | 67 | 66 | 67 | 67 |
| Tensile Strength (MPa) | 16.4 | 14.7 | 11.8 | 16.2 | 15.3 | 16.0 | 15.1 |
| Modulus at 100% elongation (MPa) | 5.5 | 5.1 | 5.4 | 5.4 | 5.5 | 5.8 | 5.7 |
| Modulus at 200% elongation (MPa) | 14.2 | 12.7 | 12.2 | 13.5 | 13.3 | 14.1 | 13.8 |
| Elongation (%) | 228 | 227 | 197 | 236 | 229 | 226 | 217 |
| Die C Tear Strength (N/mm) | 32.8 | 32.4 | 27.7 | 35.5 | 35.2 | 33.0 | 35.6 |
| Compression Set @ 150° C. (%) | 8.1 | 6.9 | 7.4 | 6.5 | 6.9 | 6.1 | 6.1 |
| *Properties after oven aging at 150° C. for 7 days (after press cure at 180° C. for 30 min)* | | | | | | | |
| Tensile Strength (MPa) | 13.4 | 13.7 | 11.8 | 14.4 | 13.4 | 14.3 | 14.1 |
| Elongation (%) | 138 | 140 | 121 | 146 | 140 | 145 | 141 |
| Tensile Strength Retained (%) | 82 | 93 | 100 | 89 | 88 | 89 | 93 |
| Elongation Retained (%) | 60 | 62 | 62 | 62 | 61 | 64 | 65 |
| *Properties after oil aging at 100° C. for 24 hours (after press cure at 180° C. for 30 min)* | | | | | | | |
| Tensile Strength (MPa) | 5.0 | 4.6 | 3.1 | 4.8 | 3.8 | 4.9 | 4.9 |
| Elongation (%) | 101 | 99 | 76 | 102 | 86 | 103 | 104 |
| Tensile Retained (%) | 31 | 31 | 26 | 30 | 25 | 31 | 33 |
| Elongation Retained (%) | 44 | 44 | 39 | 43 | 37 | 45 | 48 |

Table 10 shows properties of other belt compounds including two PEDM polymers replacing Vistalon™ 706 EPDM. Tack improvement was generally observed when PEDM blends were incorporated in the compounds. In general, the tack improvement was higher at a higher PEDM loading, and there was a balance between tack improvement and curing/physical properties (e.g., curing state and tear strength after curing).

TABLE 10

Belt Compound Properties

| Sample ID | C6.1 | E6.1 | E6.2 | E6.3 | E6.4 | E6.5 | E6.6 | E6.7 | E6.8 | E6.9 |
|---|---|---|---|---|---|---|---|---|---|---|
| VISTALON ™ 706 loading (phr) | 100 | 80 | 70 | 80 | 70 | 80 | 70 | 0 | 0 | 0 |
| PEDM-A ID | N.A. | Samp-13 | | Samp-13 | | Samp-4 | | Samp-13 | Samp-13 | Samp-4 |
| PEDM-A loading (phr) | 0 | 10 | 15 | 10 | 15 | 10 | 15 | 50 | 50 | 50 |
| PEDM-B ID | N.A. | Samp-11 | | Samp-4 | | Samp-11 | | Samp-11 | Samp-4 | Samp-11 |
| PEDM-B loading (phr) | 0 | 10 | 15 | 10 | 15 | 10 | 15 | 50 | 50 | 50 |
| *Properties in green state* | | | | | | | | | | |
| Green tack (gram/inch) | 45 | 154 | 153 | 80 | 96 | 51 | 98 | 1345 | 1348 | 237 |
| Compound ML at 100° C. (MU) | 108 | 104 | 100 | 106 | 104 | 111 | 111 | 84 | 91 | 124 |
| Stress @ 10% strain (MPa) | 0.99 | 0.83 | 0.79 | 0.78 | 0.80 | 0.83 | 0.77 | 0.67 | 0.58 | 0.66 |

TABLE 10-continued

Belt Compound Properties

| Sample ID | C6.1 | E6.1 | E6.2 | E6.3 | E6.4 | E6.5 | E6.6 | E6.7 | E6.8 | E6.9 |
|---|---|---|---|---|---|---|---|---|---|---|
| Stress @25% strain (MPa) | 1.29 | 1.03 | 0.96 | 0.97 | 1.00 | 1.03 | 0.94 | 0.79 | 0.69 | 0.82 |
| Die C Tear Strength (N/mm) | 15.1 | 12.0 | 12.9 | 14.0 | 13.6 | 14.4 | 13.3 | 10.3 | 9.1 | 10.2 |
| Curing properties | | | | | | | | | | |
| MH-ML (dN · m) | 33.4 | 27.8 | 25.5 | 29.1 | 26.4 | 29.4 | 28.2 | 13.8 | 15.2 | 21.3 |
| t90 (min) | 4.15 | 4.15 | 4.22 | 4.27 | 4.24 | 4.23 | 4.41 | 4.92 | 5.01 | 5.04 |
| ts2 (min) | 0.43 | 0.47 | 0.48 | 0.46 | 0.48 | 0.46 | 0.48 | 0.59 | 0.56 | 0.54 |
| Properties after cure (press cure at 180° C. for 30 min) | | | | | | | | | | |
| Hardness (Shore A) | 80 | 78 | 77 | 78 | 76 | 77 | 76 | 72 | 72 | 74 |
| Tensile Strength (MPa) | 23.1 | 21.9 | 19.7 | 20.5 | 21.0 | 22.1 | 22.6 | 13.6 | 15.8 | 19.2 |
| Modulus at 100% elongation (MPa) | 4.7 | 4.5 | 4.4 | 4.7 | 4.7 | 4.8 | 4.7 | 3.7 | 3.9 | 4.5 |
| Modulus at 200% elongation (MPa) | 10.7 | 10.4 | 10.2 | 10.9 | 10.9 | 11.2 | 11.0 | 7.2 | 8.0 | 10.3 |
| Elongation (%) | 407 | 392 | 378 | 350 | 374 | 363 | 386 | 451 | 409 | 364 |
| Die C Tear Strength (N/mm) | 49.6 | 43.9 | 41.2 | 44.1 | 42.7 | 45.6 | 44.0 | 33.7 | 35.8 | 35.3 |
| Properties after oven aging at 150° C. for 7 days (after press cure at 180° C. for 30 min) | | | | | | | | | | |
| Tensile Strength (MPa) | 18.4 | 17.9 | 17.1 | 17.6 | 17.5 | 18.7 | 19.1 | 12.3 | 13.1 | 15.5 |
| Elongation (%) | 316 | 327 | 306 | 311 | 313 | 311 | 315 | 295 | 262 | 232 |
| Hardness (Shore A) | 81 | 81 | 80 | 81 | 79 | 81 | 80 | 80 | 79 | 80 |

Table 11 shows tack of rubber to common polar substrates, polycarbonate, Aluminum, and stainless steel, for EPDM belt and hose compounds containing PEDM. In general, tack of rubber to the polar substrates was improved with PEDM incorporation.

TABLE 11

Tack of rubber to polar substrates for belt and hose compounds

| Sample ID | C7.1 | E7.1 | E7.2 | E7.3 | E7.4 | C7.2 | E7.5 | E7.6 | E7.7 | E7.8 |
|---|---|---|---|---|---|---|---|---|---|---|
| EPDM | VISTALON™ 2504 | | | | | VISTALON™ 7500 | | | | |
| PEDM ID | N.A. | Samp-11 | | Samp-4 | | N.A. | Samp-11 | | Samp-4 | |
| PEDM loading (phr) | 0 | 20 | 30 | 20 | 30 | 0 | 10 | 20 | 10 | 20 |
| Tack to Polycarbonate (gram/inch) | 68 | 118 | 137 | 89 | 78 | 8 | 26 | 30 | 13 | 25 |
| Tack to Aluminum (gram/inch) | 19 | 23 | 31 | 22 | 22 | | | | | |
| Tack to stainless steel (gram/inch)[a] | | | | | | <5 [b] | 20 | 27 | 16 | 17 |

[a] Dwell time is 4 min
[b] Under detection limit

Table 12 shows properties of roofing compounds. In general, the compounds with PEDM (E12.1-E12.9) showed tack improvement over the Vistalon™ 9301 control compound (C12.1). In particular, E12.7, E12.8, and E12.9 containing Samp-14 showed the best tack improvement. In comparison to the control compounds containing Escorez™ 1102 (C12.2-C12.4), the compounds containing PEDM showed better retention in curing state, hardness and tensile strength.

TABLE 12

Roofing Compound Properties

| Sample ID | C12.1 | C12.2 | C12.3 | C12.4 | E12.1 | E12.2 | E12.3 | E12.4 | E12.5 | E12.6 | E12.7 | E12.8 | E12.9 |
|---|---|---|---|---|---|---|---|---|---|---|---|---|---|
| VISTALON™ 9301 loading (phr) | | 100 | | | 95 | 90 | 80 | 95 | 90 | 80 | 95 | 90 | 80 |
| PEDM ID | | N.A. | | | | Samp-13 | | | Samp-1 | | | Samp-14 | |
| PEDM loading (phr) | | 0 | | | 5 | 10 | 20 | 5 | 10 | 20 | 5 | 10 | 20 |
| Escorez™ 1102 loading (phr) | 0 | 5 | 10 | 20 | | | | | 0 | | | | |
| Properties in green state | | | | | | | | | | | | | |
| Green tack (gram/inch) | 461 | 577 | 909 | 820 | 829 | 739 | 551 | 380 | 617 | 1391 | 942 | 1676 | 1210 |
| Green tack after aging at room temp. for 1 month (gram/inch) | 229 | 455 | 559 | 637 | 348 | 432 | 479 | 581 | 187 | 435 | 2033 | 1479 | 257 |
| Compound ML at 100° C. (MU) | 67 | 62 | 58 | 51 | 64 | 62 | 58 | 65 | 64 | 60 | 63 | 61 | 56 |
| Curing properties | | | | | | | | | | | | | |
| MH-ML (dN · m) | 13.5 | 11.9 | 10.1 | 6.9 | 13.4 | 13.0 | 12.3 | 14.0 | 13.5 | 13.8 | 13.6 | 13.4 | 13.7 |
| t90 (min) | 4.08 | 4.51 | 4.81 | 4.90 | 4.51 | 4.57 | 4.67 | 4.42 | 4.26 | 4.92 | 5.49 | 5.72 | 5.63 |
| Mooney Scorch, t5, (min) | 19.1 | 20.4 | 21.9 | 24.5 | 19.4 | 19.9 | 20.3 | 18.6 | 18.9 | 19.2 | 19.7 | 20.4 | 20.7 |
| Properties after cure (press cure at 180° C. for 30 min) | | | | | | | | | | | | | |
| Hardness (Shore A) | 67 | 65 | 61 | 59 | 65 | 65 | 65 | 66 | 67 | 64 | 64 | 64 | 64 |
| Tensile Strength (MPa) | 13.6 | 12.7 | 11.4 | 9.6 | 13.1 | 12.7 | 11.4 | 13.1 | 12.2 | 12.3 | 13.3 | 12.9 | 11.9 |
| Elongation (%) | 504 | 573 | 642 | 733 | 501 | 477 | 475 | 484 | 450 | 438 | 476 | 495 | 462 |
| Properties after oven aging at 150° C. for 7 days (after press cure at 180° C. for 30 min) | | | | | | | | | | | | | |
| Tensile Strength (MPa) | 13.8 | 12.9 | 11.7 | 10.0 | 13.2 | 12.2 | 11.5 | 12.9 | 12.1 | 12.2 | 13.1 | 12.9 | 11.7 |
| Elongation (%) | 421 | 496 | 530 | 636 | 400 | 376 | 402 | 396 | 388 | 365 | 392 | 400 | 361 |
| Die C Tear Strength (N/mm) | 69 | 67 | 65 | 61 | 68 | 68 | 68 | 69 | 69 | 67 | 67 | 67 | 67 |

All documents described herein are incorporated by reference herein, including any priority documents and/or testing procedures to the extent they are not inconsistent with this text. As is apparent from the foregoing general description and the specific embodiments, while some embodiments have been illustrated and described, various modifications can be made without departing from the spirit and scope of the disclosure. Accordingly, it is not intended that the disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. An elastomeric composition comprising:
   from 1 to 99 parts by weight per hundred parts by weight rubber (phr) of a first propylene-α-olefin-diene (PEDM) terpolymer comprising 70 wt % to 92.5 wt % propylene, 7.5 wt % to 30 wt % a C2 or C4-C12 α-olefin, and 3.5 wt % to 20 wt % diene, said wt % based on the weight of the PEDM terpolymer, wherein the wt % numbers are uncorrected numbers wherein wt % propylene plus wt % C2 or C4-C12 α-olefin equals 100% and wherein the PEDM terpolymer has a Mooney viscosity (ML(1+4)) of 25 MU to 100 MU; and
   from 1 to 99 phr of an ethylene-based copolymer comprising 40 wt % to 95 wt % ethylene, 0.5 wt % to 10 wt % of one or more dienes, and 5 wt % to 60 wt % C3 to C12 α-olefin, said wt % based on the total weight of the ethylene-based copolymer, wherein the sum of the phr of the PEDM and the phr of the ethylene-based copolymer equals 100 phr.

2. The elastomeric composition of claim 1, further comprising from 1 to 90 phr of a second PEDM terpolymer comprising 1 wt % to 7 wt % of C2 or C4-12 α-olefin, 93 wt % to 99 wt % propylene, and 0.5 wt % to 7.5 wt % diene, and a Mooney viscosity (ML(1+4)) of 10 to 50 MU.

3. The elastomeric composition of claim 1, wherein the first PEDM terpolymer comprises 10 wt % to 30 wt % α-olefin, and 4 wt % to 10 wt % diene.

4. The elastomeric composition of claim 1, wherein the first PEDM terpolymer has a Mooney viscosity of 30 to 100 MU or 61 to 100 MU.

5. The elastomeric composition of claim 1, further comprising 5 to 200 phr oil.

6. The elastomeric composition of claim 1, wherein the PEDM terpolymer has a polymer Tg (° C.) greater than or equal to $-7.386-(87.98*E)+(294*D)$ and less than or equal to $-1.386-(87.98*E)+(294*D)$ wherein E is the mole fraction of ethylene in the polymer and D is the mole fraction of diene in the polymer.

7. The elastomeric composition of claim 1, wherein the PEDM terpolymer has a heat of fusion (Hf) of less than 1 J/g.

8. The elastomeric composition of claim 1, wherein the PEDM polymer has a number average molecular weight of 30,000 g/mol to 300,000 g/mol.

9. The elastomeric composition of claim 1, wherein the PEDM polymer has a weight average molecular weight of 60,000 g/mol to 600,000 g/mol.

10. The elastomeric composition of claim 1, wherein the PEDM polymer has a polydispersity index of 1.8 to 3.5.

11. The elastomeric composition of claim 1, wherein the composition has a rubber-to-rubber tack force of 20 g of force/inch width to 6000 g of force/inch width.

12. The elastomeric composition of claim 1, wherein the composition has a rubber-to-rubber tack force after aging at room temperature for 1 month of 20 g of force/inch width or greater.

13. The elastomeric composition of claim 1, wherein the composition has a percent retention in a green rubber-to-rubber tack force from blending to aging at room temperature for 1 month of 20% to 250%.

14. The elastomeric composition of claim 1, wherein the composition is affixed to a polar substrate, and wherein the composition has a rubber-to-polar substrate tack force of 10 g of force/inch width or greater, wherein the polar substrate is selected from the group consisting of cotton, rayon, polyamide, polyester, aramid, stainless steel, aluminum, glass, carbon, polyketone, polycarbonate, basalt, boron, and oriented discontinuous fibers.

15. An at least partially crosslinked elastomeric composition that is the reaction product of:
a composition according to claim 1;
one or more vulcanization activators; and
one or more vulcanizing agents.

16. A belt comprising: the elastomeric composition according to claim 1.

17. An elastomeric composition comprising:
from 1 to 30 parts by weight per hundred parts by weight rubber (phr) of a propylene-α-olefin-diene (PEDM) terpolymer comprising 70 wt % to 92.5 wt % propylene, 7.5 wt % to 30 wt % a C2 or C4-C12 α-olefin, and 0.5 wt % to 3.4 wt % diene, said wt % based on the weight of the PEDM terpolymer, wherein the PEDM terpolymer has a Mooney viscosity (ML(1+4)) of 10 MU to 100 MU; and
from 70 to 99 phr of an ethylene-based copolymer comprising 40 wt % to 95 wt % ethylene, 0 wt % to 10 wt % of one or more dienes, and 5 wt % to 60 wt % C3 to C12 α-olefin, said wt % based on the total weight of the ethylene-based copolymer.

18. A roofing membrane comprising the composition of claim 17.

19. A composition comprising:
the elastomeric composition of claim 1 adhered to at least one polyester substrate selected from the group consisting of: a polyester film, a polyester cord, a polyester woven fabric, and a polyester nonwoven fabric.

20. A composition comprising:
the elastomeric composition of claim 1 adhered to at least one substrate selected from the group consisting of: cotton, rayon, polyamide, polyester, polycarbonate, aramid, steel, aluminum, glass, carbon, polyketone, basalt, boron, and discontinuous fibers.

21. The composition of claim 19 or 20, wherein the substrate comprises a treated surface.

22. The composition of claim 21, wherein the treated surface comprises a physically bonded coating on the substrate.

23. The composition of claim 21, wherein the treated surface comprises a chemically bonded coating on the substrate.

24. The composition of claim 22, wherein the coating comprises the PEDM.

25. The composition of claim 1, comprising:
from 1 to 40 phr of the PEDM; and
from 99 to 60 phr of the ethylene-based copolymer.

26. The composition of claim 1, comprising:
from 20 to 30 phr of the PEDM, and
from 80 to 70 phr of the ethylene-based copolymer.

* * * * *